US009601998B2

United States Patent
Le et al.

(10) Patent No.: US 9,601,998 B2
(45) Date of Patent: Mar. 21, 2017

(54) HYBRID REGULATOR INCLUDING A BUCK CONVERTER AND A SWITCHED CAPACITOR CONVERTER

(71) Applicant: Lion Semiconductor Inc., Berkeley, CA (US)

(72) Inventors: Hanh-Phuc Le, Richmond, CA (US); John Crossley, Oakland, CA (US); Alberto Puggelli, Albany, CA (US); Wonyoung Kim, Berkeley, CA (US)

(73) Assignee: LION SEMICONDUCTOR INC., Berkeley, CA (US)

( * ) Notice: Subject to any disclaimer, the term of this patent is extended or adjusted under 35 U.S.C. 154(b) by 84 days.

(21) Appl. No.: 14/508,229

(22) Filed: Oct. 7, 2014

(65) Prior Publication Data

US 2015/0097538 A1  Apr. 9, 2015

Related U.S. Application Data

(60) Provisional application No. 61/887,581, filed on Oct. 7, 2013.

(51) Int. Cl.
*H02M 3/07* (2006.01)
*H02M 3/158* (2006.01)
*H02M 1/00* (2006.01)

(52) U.S. Cl.
CPC ............ *H02M 3/158* (2013.01); *H02M 3/07* (2013.01); *H02M 2001/007* (2013.01)

(58) Field of Classification Search
CPC ........... H02M 2001/007; H02M 3/007; H02M 2001/0048; H02M 3/156
See application file for complete search history.

(56) References Cited

U.S. PATENT DOCUMENTS 5,552,694 A * 9/1996 Appeltans ............. H02M 3/157
323/222
8,212,541 B2 * 7/2012 Perreault ................ H02M 3/07
323/271

(Continued)

FOREIGN PATENT DOCUMENTS

EP           2493060 A1    8/2012
JP         2009017772 A    1/2009

(Continued)

OTHER PUBLICATIONS

International Search Report and Written Opinion Issued by the European Patent Office as International Searching Authority for International Application No. PCT/US2014/033759 mailed Feb. 4, 2015 (18 pgs.).

(Continued)

*Primary Examiner* — Harry Behm
*Assistant Examiner* — Peter Novak
(74) *Attorney, Agent, or Firm* — Wilmer Cutler Pickering Hale and Dorr LLP

(57) ABSTRACT

The present disclosure includes a feedback system that can control hybrid regulator topologies that have multiple converters or regulators connected in series. The hybrid regulator can include at least two regulators: a switched inductor regulator and a switched-capacitor regulator. The disclosed embodiments of the feedback system can simplify feedback design for the hybrid regulator that can include multiple converter stages. These disclosed embodiments can control the feedback to improve the efficiency of a hybrid regulator.

21 Claims, 14 Drawing Sheets

(56) References Cited

U.S. PATENT DOCUMENTS

| | | | |
|---|---|---|---|
| 2008/0157732 A1 | 7/2008 | Williams | |
| 2008/0158915 A1 | 7/2008 | Williams | |
| 2008/0238390 A1* | 10/2008 | Trivedi | H02M 3/1584 323/283 |
| 2009/0206804 A1 | 8/2009 | Xu et al. | |
| 2011/0221482 A1 | 9/2011 | Kim et al. | |
| 2015/0028839 A1* | 1/2015 | Petrovic | H02M 3/07 323/311 |

FOREIGN PATENT DOCUMENTS

| | | |
|---|---|---|
| JP | 2013065939 A | 4/2013 |
| WO | WO-2010130588 A2 | 11/2010 |
| WO | WO-2012151466 A2 | 11/2012 |

OTHER PUBLICATIONS

International Search Report and Written Opinion Issued by the Korean Intellectual Property Office as International Searching Authority for International Application No. PCT/US2014/059404 mailed Jan. 27, 2015 (14 pgs.).

Kim et al., "A Fully-Integrated 3-Level DC-DC Converter for Nanosecond-Scale DVFS," IEEE Journal of Solid-State Circuits, vol. 47, No. 1, Jan. 2012 (pp. 206-219).

Kim et al., "System Level Analysis of Fast, Per-Core DVFS Using On-Chip Switching Regulators," IEEE International Symposium of High-Performance Computer Architecture (HPCA), Feb. 2008 (12 pgs.).

Le et al., "Design Techniques for Fully Integrated Switched-Capacitor DC-DC Converters," IEEE Journal of Solid-State Circuits, vol. 46, No. 9, Sep. 2011 (pp. 2120-2131).

* cited by examiner $V_{TMP} = V_{IN} \times (M/N) - V_{SC\_DROP}$
324

| Load | Switches On | Switches Off | Description |
|---|---|---|---|
| 6 < | none | 1, 2, 3 | Use converters 1,2,3 |
| 3 < and 6 | 1 | 2, 3 | Use converters 2,3 |
| 2 < and 3 | 2 | 1, 3 | Use converters 1,3 |
| 2 | 1, 2 | 3 | Use converter 3 |

FIG. 9

HYBRID REGULATOR INCLUDING A BUCK CONVERTER AND A SWITCHED CAPACITOR CONVERTER

CROSS-REFERENCE TO RELATED APPLICATION

This application claims the benefit of the earlier priority date of U.S. Provisional Patent Application No. 61/887,581, entitled "APPARATUS, SYSTEMS, AND METHODS FOR PROVIDING FEEDBACK CONTROL IN HYBRID VOLTAGE REGULATORS," filed on Oct. 7, 2013, which is expressly incorporated herein by reference in its entirety.

STATEMENT REGARDING FEDERALLY SPONSORED RESEARCH OR DEVELOPMENT

This invention was made with government support under 1248828 and 1353640 awarded by the National Science Foundation (NSF). The government has certain rights in the invention.

TECHNICAL FIELD

The present disclosure relates to feedback control in hybrid voltage regulators.

BACKGROUND

There is a strong demand to reduce the size of electronic systems. The size reduction is especially desirable in mobile electronic devices in which the space is a premium, but is also desirable in servers that are placed in big data centers since it is important to squeeze in as many servers as possible in a fixed real estate.

One of the largest components in electronic systems is a voltage regulator (also referred to as a power regulator). A voltage regulator can include a semiconductor chip, such as a DC-DC regulator chip, that delivers voltage from a voltage source (e.g., a battery) to an output load. The output load can include a variety of integrated chips (e.g., an application processor, a processor, a memory device, such as a dynamic read access memory (DRAM) and a NAND flash memory, radio-frequency (RF) chips, WiFi combo chips, and power amplifiers) in an electronic device. Unfortunately, a voltage regulator can include many bulky electronic components. Since each integrated chip may need a dedicated voltage regulator, it is desirable to reduce the size of the voltage regulators in electronic systems.

A voltage regulator can include a switched-inductor regulator. A switched-inductor regulator transfers charges from the power source to the output load using an inductor. A switched-inductor regulator can use power switches to connect/disconnect the inductor to one of multiple voltages, and provide an output voltage that is a weighted average of the multiple voltages. A switched-inductor regulator can adjust the output voltage by controlling the amount of time the inductor is coupled to one of the multiple voltages.

Unfortunately, a switched-inductor regulator is often not suitable for highly integrated electronic systems. The conversion efficiency of a switched-inductor regulator depends on the quality and size of the inductor, in particular when the power conversion ratio is high and when the amount of current consumed by the output load is high. Because an inductor can occupy a large area and is bulky to integrate on-die or on-package, existing switched-inductor regulators often use a large number of off-chip inductor components. This strategy often requires a large area on the printed circuit board, which in turn increases the size of the electronic device. The challenge is exacerbated as mobile system-on-chips (SoCs) become more complex and need increasingly larger number of voltage domains to be delivered by the voltage regulator.

SUMMARY

Some embodiments of the disclosed subject matter include a voltage regulator system. The voltage regulator system includes a hybrid regulator configured to convert an input voltage to an output voltage, wherein the hybrid regulator comprises a plurality of voltage regulators including at least a switched-inductor regulator and a switched-capacitor regulator, and wherein the switched-inductor regulator is configured to operate in a discontinuous conduction mode. The voltage regulator system can also include a first feedback system configured to compare the output voltage to a reference voltage to determine a first operating frequency of the switched-inductor regulator and a second operating frequency of the switched-capacitor regulator, cause the switched-inductor regulator to operate at the first operating frequency, and cause the switched-capacitor regulator to operate at the second operating frequency, thereby causing the hybrid regulator to provide the output voltage that is within a tolerance range of the reference voltage.

In any of the disclosed embodiments disclosed herein, the first feedback system can be configured to cause the switched-inductor regulator to operate at the first operating frequency by providing a first periodic signal having the first operating frequency to the switched-inductor regulator.

In any of the disclosed embodiments disclosed herein, the switched-inductor regulator comprises a multi-phase switched-inductor regulator having a plurality of regulator cells, and wherein the first feedback system can be configured to cause the switched-inductor regulator to operate at the first operating frequency by providing a plurality of periodic signals having the first operating frequency to the switched-inductor regulator, wherein the plurality of periodic signals are out-of-phase from one another.

In any of the disclosed embodiments disclosed herein, the feedback system comprises a feedback control that can be configured to generate a first periodic signal, based on the reference voltage and the output voltage, having the second operating frequency.

In any of the disclosed embodiments disclosed herein, the feedback system comprises a frequency divider that can be configured to receive the first periodic signal generated by the feedback control and to generate a second periodic signal having the first operating frequency, and wherein the feedback system can be configured to provide the first periodic signal to the switched-capacitor regulator and the second periodic signal to the switched-inductor regulator.

In any of the disclosed embodiments disclosed herein, the voltage regulator system can include a second feedback system that can be configured to determine a difference between a parasitic voltage drop and a target voltage drop of the switched-capacitor regulator and cause the switched-inductor regulator to adjust current provided to the switched-capacitor regulator based on the difference.

In any of the disclosed embodiments disclosed herein, the second feedback system can be configured to cause the switched-inductor regulator to adjust the current provided to the switched-capacitor regulator by adjusting one or more of a switching period, an active period, and a duty cycle D of the switched-inductor regulator.

In any of the disclosed embodiments disclosed herein, the first operating frequency can be a fraction of the second operating frequency.

In any of the disclosed embodiments disclosed herein, the voltage regulator system can include a plurality of bypass switches, wherein one of the bypass switches can be configured to couple an input node of a first voltage regulator and an output node of a second voltage regulator in the hybrid regulator.

In any of the disclosed embodiments disclosed herein, the voltage regulator system can include a control block configured to determine a status of the bypass switches based on one or more of: the input voltage of the hybrid regulator, the output voltage of the hybrid regulator, and a conversion ratio of the switched-capacitor regulator in the hybrid regulator.

Some embodiments of the disclosed subject matter include an electronic system. The electronic system can include a load chip comprising a power domain, wherein the power domain comprises a first input voltage terminal and a first ground terminal, and a voltage regulator system in accordance with any of the disclosed embodiments disclosed herein, wherein the voltage regulator system can be configured to provide the output voltage of the voltage regulator system to the first input voltage terminal of the load chip.

Some embodiments of the disclosed subject matter include a method of providing an output voltage based on an input voltage. The method includes providing a hybrid regulator configured to convert the input voltage to the output voltage, wherein the hybrid regulator comprises a plurality of voltage regulators including at least a switched-inductor regulator and a switched-capacitor regulator, and wherein the switched-inductor regulator can be configured to operate in a discontinuous conduction mode, comparing, at a first feedback system, the output voltage to a reference voltage to determine a first operating frequency of the switched-inductor regulator and a second operating frequency of the switched-capacitor regulator, causing, by the first feedback system, the switched-inductor regulator to operate at the first operating frequency, and causing, by the first feedback system, the switched-capacitor regulator to operate at the second operating frequency, thereby causing the hybrid regulator to provide the output voltage that can be within a tolerance range of the reference voltage.

In any of the disclosed embodiments disclosed herein, causing the switched-inductor regulator to operate at the first operating frequency comprises providing a first periodic signal having the first operating frequency to the switched-inductor regulator.

In any of the disclosed embodiments disclosed herein, the switched-inductor regulator comprises a multi-phase switched-inductor regulator having a plurality of regulator cells, and wherein causing the switched-inductor regulator to operate at the first operating frequency comprises providing a plurality of periodic signals having the first operating frequency to the switched-inductor regulator, wherein the plurality of periodic signals are out-of-phase from one another.

In any of the disclosed embodiments disclosed herein, the method further includes generating, at a feedback control in the feedback system, a first periodic signal having the second operating frequency based on the reference voltage and the output voltage.

In any of the disclosed embodiments disclosed herein, the method further includes receiving, at a frequency divider in the feedback system, the first periodic signal generated by the feedback control, generating, by the frequency divider, a second periodic signal having the first operating frequency, and providing the first periodic signal to the switched-capacitor regulator and the second periodic signal to the switched-inductor regulator.

In any of the disclosed embodiments disclosed herein, the method further includes determining a difference between a parasitic voltage drop and a target voltage drop of the switched-capacitor regulator, and causing the switched-inductor regulator to adjust current provided to the switched-capacitor regulator based on the difference.

In any of the disclosed embodiments disclosed herein, causing the switched-inductor regulator to adjust the current provided to the switched-capacitor regulator by adjusting one or more of: a switching period, an active period, and a duty cycle D of the switched-inductor regulator.

In any of the disclosed embodiments disclosed herein, the hybrid regulator system comprises a plurality of bypass switches, wherein one of the bypass switches can be configured to couple an input node and an output node of the one of the voltage regulators in the hybrid regulator.

In any of the disclosed embodiments disclosed herein, the method further includes determining a status of the bypass switches based on one or more of: the input voltage of the hybrid regulator, the output voltage of the hybrid regulator, and a conversion ratio of the switched-capacitor regulator in the hybrid regulator.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 9 illustrates a lookup table for controlling bypass switches in accordance with some embodiments.

DETAILED DESCRIPTION

In the following description, numerous specific details are set forth regarding the apparatus, systems, and methods of the disclosed subject matter and the environment in which such apparatus, systems, and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other apparatus, systems, and methods that are within the scope of the disclosed subject matter.

Modern electronic systems have been tightly integrated as a system-on-chip (SoC) that includes multiple processing cores and heterogeneous components (e.g., memory controllers, hardware accelerators) within a single chip. These SoCs often use a large number of voltage domains to power the heterogeneous components. Such a large number of voltage domains are often powered by a power management integrated circuit (PMIC), which provides a plurality of voltages using a plurality of off-chip voltage regulators. Unfortunately, a PMIC often uses bulky, discrete inductors and capacitors that consume a large amount of volume, which can be critical in portable electronic devices with limited available space.

Given the drawback of existing PMICs, there has been a surge of interest in building voltage regulators that use smaller discrete components or even integrated voltage regulators (IVRs) that integrate components in a single die. One of such voltage regulators includes a switching regulator.

Figure 1A:
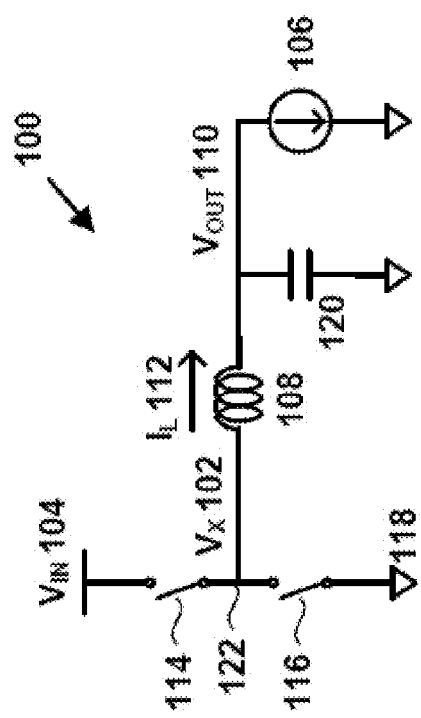
FIGS. 1A-1B illustrate a step-down switched-inductor regulator and its operation.
Figure 1B:
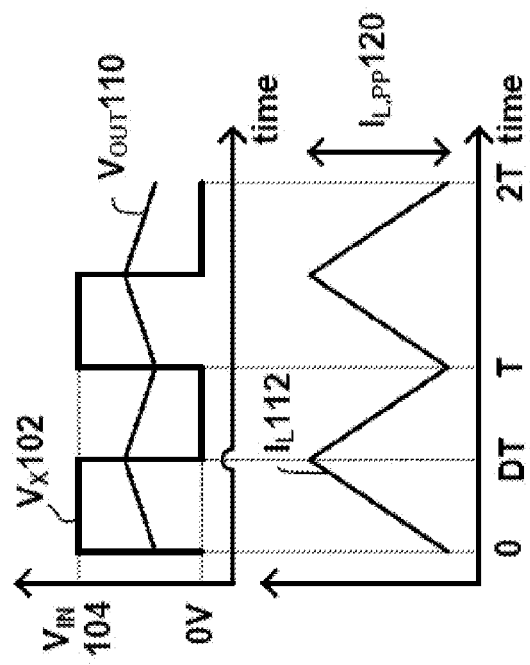

One class of a switching regulator includes a switched-inductor (SI) regulator, such as a buck regulator, a boost regulator, a flying buck regulator, or a flipped flying buck regulator disclosed in U.S. Utility patent application Ser. No. 14/250,970, titled "APPARATUS, SYSTEMS, AND METHODS FOR PROVIDING A HYBRID POWER REGULATOR," by Le et al., filed on Apr. 11, 2014, which is herein incorporated by reference in its entirety. FIGS. 1A-1B illustrate a step-down switched-inductor (SI) regulator and its operation. The SI regulator can convert a high voltage to a lower voltage. As illustrated in FIG. 1A, the SI regulator 100 can include an inductor 108 and two switches 114, 116. The SI regulator 100 can connect a first terminal of the inductor 108 to one of (1) a first voltage source $V_{IN}$ 104 and (2) a second voltage source 118 through a set of power switches 114, 116. In some cases, the second voltage source 118 can include, but is not limited to, a ground voltage source. The power switches 114, 116 can be turned on and off using external inputs. In some cases, the power switches 114, 116 can be controlled so that the two switches are not turned on at the same time. The power switches 114, 116 can include transistors. The transistors can include a metal-oxide-semiconductor field-effect transistor (MOSFET). For example, the switch 114 can include a P-channel MOSFET transistor; the switch 116 can include an N-channel MOSFET transistor.

FIG. 1B illustrates a signal diagram of the switched-inductor regulator in FIG. 1A. As the power switches 114, 116 turn on and off with a period T, the input of the inductor $V_X$ 102 can swing between 0 and $V_{IN}$ with a period T. The inductor 108 and capacitor 120 operate as a low-pass filter that averages $V_X$ 102 over time, thereby creating a signal at the regulator output $V_{OUT}$ 110 with a small voltage ripple. The output voltage $V_{OUT}$ 110 can depend on the amount of time the inductor 108 is coupled to the first voltage source $V_{IN}$ 104 and the amount of time the inductor 108 is coupled to the second voltage source 118. For example, the SI regulator 100 can adjust the level of $V_{OUT}$ 510 to $V_{IN}$D+ (0V) (1−D), where D, a number between 0 and 1, is the portion of time $V_X$ is coupled to $V_{IN}$. D is also referred to as a duty cycle. The output load that consumes the current 106 can be any type of an electronic device, including one or more of processors, memory (DRAM, NAND flash), RF chips, WiFi combo chips, and power amplifiers.

A power efficiency of the SI regulator 100 can be computed as:

$$\eta = \frac{P_L}{P_O}$$

where $P_L$ indicates the power delivered to the output load 106 and $P_O$ indicates the output power of the SI regulator 100. $P_L$ can be computed as follows: $P_L = P_O - P_{LOSS}$, where $P_{LOSS}$ includes the amount of power losses during the voltage regulation process.

One of the major power losses $P_{LOSS}$ associated with a SI regulator 100 includes a resistive power loss incurred by the parasitic resistance of the inductor 108. When the SI regulator 100 delivers power to the output load 106 by providing current 112, ideally, the SI regulator 100 provides all of its output power to the output load 106. In this ideal configuration, the inductor 108 has zero resistance, and, therefore, the current through the inductor 108 would not dissipate any power. However, in a practical scenario, the SI regulator 100 dissipates some of its output power internally at the inductor 108, primarily due to the resistance of the material forming the inductor 108. This undesirable, finite resistance of the inductor 108 is referred to as a parasitic resistance of the inductor 108. The parasitic resistance can incur a resistive power loss since the parasitic resistance can cause the current through the inductor 108 to dissipate energy. Therefore, the resistive power loss can reduce the power conversion efficiency of the SI regulator 100.

When the current alternates with a predetermined period T, then the resistive power loss can be computed as $P_R = I_{L,RMS}^2 R_L$, where $R_L$ is the value of the parasitic resistance of the inductor 108, and $I_{L,RMS}$ is the root-mean square of the current through the inductor 108. $I_{L,RMS}$ can be reduced by reducing the peak-to-peak ripple of the inductor current ($I_{L,PP}$ 120). Therefore, the SI regulator 100 can reduce the resistive loss $P_R$ by reducing the peak-to-peak ripple of the inductor current $I_{L,PP}$ 120.

There are two ways to reduce the peak-to-peak ripple of the inductor current $I_{L,PP}$ 120. First, the SI regulator 100 can be operated at a high frequency and reduce the period T of the SI regulator 100. However, this solution can increase the power consumed to charge and discharge the parasitic capacitance at the junction 122 between switches 114, 116. This capacitive power loss can be significant because the size of the switches 114, 116 can be large, which increases the parasitic capacitance, and because the voltage swing on $V_X$ 102 is large (e.g., 0V~$V_{IN}$). This capacitive power loss can be computed as follows: $P_C = fCV^2$, where C is the amount of the parasitic capacitance at the junction 122, f is the frequency at which the SI regulator 100 switches, and V is the voltage swing at the junction 122.

Second, the SI regulator 100 can use an inductor 108 with a high inductance value. However, this approach makes the inductor 108 occupy a large volume, which can be problematic in many electronic devices, including portable electronic devices.

Another class of a switching regulator includes a switched-capacitor (SC) regulator. An SC regulator can use one or more capacitors, instead of inductors, to transfer charge from a power source $V_{IN}$ to an output load $V_{OUT}$. An SC regulator can use power switches to couple or decouple one or more capacitors to one of multiple voltages over a period of time, thereby providing an output voltage that is a weighted average of the multiple voltages. The SC regulator can control the output voltage by changing the configuration and the sequence in which capacitors are coupled to one another. Oftentimes, it is easier to implement an SC regulator with a small form factor compared to implementing an SI regulator because capacitors generally have a higher quality (e.g., lower series resistance) compared with inductors, particularly in integrated implementations.

Unfortunately, efficiencies of SC regulators can degrade at output voltages that are not a predetermined fraction of the input voltage. For example, an SC regulator can achieve high efficiencies at ½, ⅓, ⅔, ⅖, ⅗ of the input voltage. However, the same SC regulator can fail to provide high efficiencies when the output voltage deviates from those values. This is a problem for many SoCs that operate within a continuous range of voltages, or a range of voltages in 5-10 mV steps.

Some of the challenges associated with the SI regulator and the SC regulator can be addressed using a hybrid regulator. The hybrid regulator can include both the SC regulator and the SI regulator in series. The hybrid regulator topology can maintain high efficiency across a wide output and input voltage range, even with small inductors and capacitors. The hybrid regulator topology can include two types of regulators: an SI regulator and an SC regulator that divides or boosts the input voltage into an M/N fraction of the input voltage, where M and N can be any number greater than zero. This approach can reduce the resistive loss of the switched inductor regulator even with a small inductor with a low inductance. Furthermore, the hybrid regulator topology can reduce the capacitive loss ($CV^2f$ loss) of the switched inductor regulator by limiting the voltage swing across the switches.

Figure 2A:
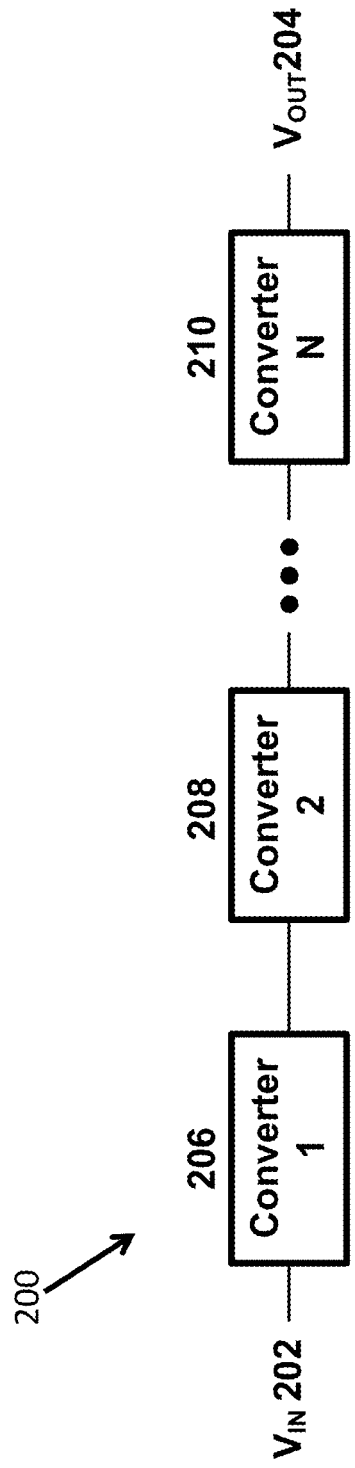
FIGS. 2A-2B illustrate a high-level diagram of a hybrid voltage regulator that has multiple converters connected in series, which can be either switched-inductor regulators or switched-capacitor regulators.

FIG. 2A illustrates a hybrid regulator topology in accordance with some embodiments. FIG. 2A includes a hybrid regulator 200 that includes two or more voltage converter stages 206, 208, 210 connected in series (in this disclosure, the term voltage converter stage is used interchangeably with a voltage regulator, a regulator, a voltage converter, and a converter), where each voltage converter stage can include a voltage regulator (also known as a voltage converter). The voltage regulator can include an SI regulator or an SC regulator, comprising one or more switches connecting/disconnecting one or more inductors or one or more capacitors, respectively. A typical inductance of the inductor in the SI regulator can range from 100 pico-Henry to 5 micro-Henry and power switches in the SI regulator can typically have width/(minimum length) values of 1000 to 100,000. For example, in a 90 nm process technology, power switch widths typically range from 100 um to 10 mm. Switching frequencies typically range from 1 MHz to 500 MHz.

Figure 2B:
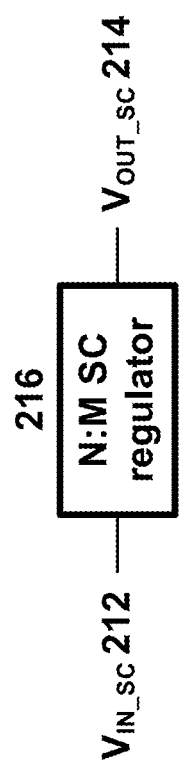

In some embodiments, an SC regulator can include an N:M step-down voltage regulator 216, as illustrated in FIG. 2B. The N:M regulator 216 is configured to reduce a received voltage $V_{IN\_SC}$ 212 to (M/N) $V_{IN\_SC}$ to generate the output $V_{OUT\_SC}$ 214. Some examples of N:M include 1:1, 2:1, 3:1, 3:2, 4:1, 4:3, 5:1, 5:2, 5:3, 5:4, 6:5, 7:1, 7:2, 7:3, 7:4, 7:5, 7:6, or any other suitable fractions. The fraction N:M can be determined based on the configuration of capacitors and switches during the voltage regulation process. The configuration of capacitors and switches can be reconfigured during the voltage regulation process to dynamically change the fraction N:M to different values (e.g., (N−1):M (N−2): M, N:(M−1), N:(M−2), (N−1):(M−1), etc.).

Figure 3A:
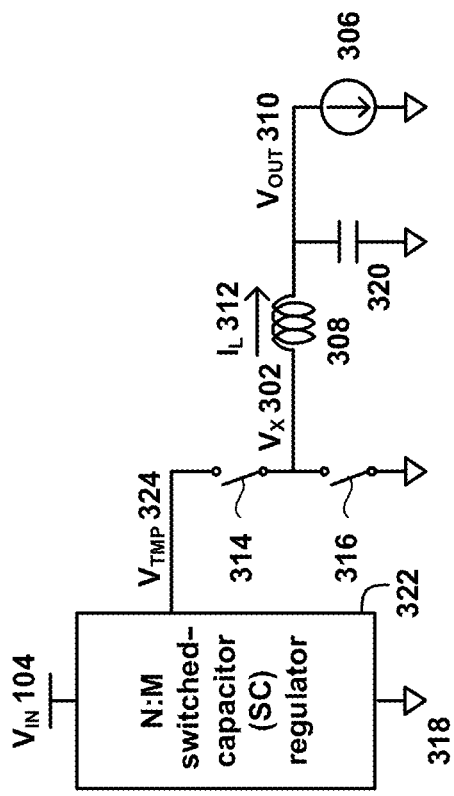
FIGS. 3A-3B illustrate a hybrid voltage regulator that includes a step-down switched-capacitor regulator at the first-stage and a switched-inductor regulator at the second stage.
Figure 3B:
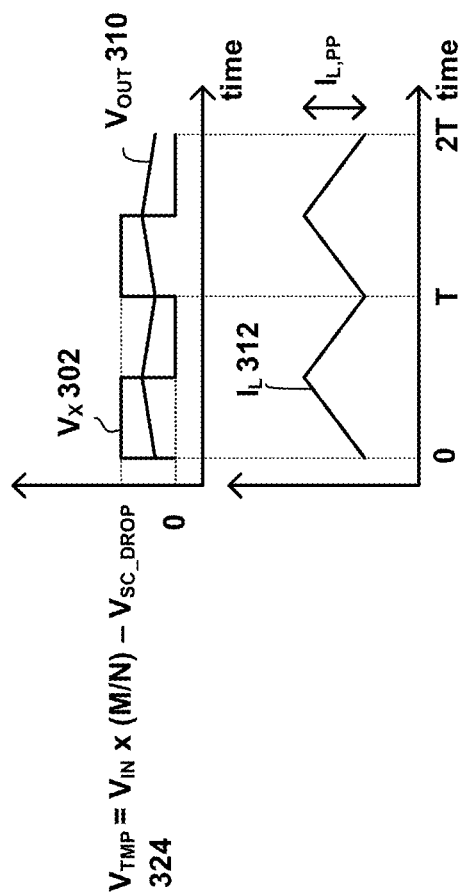

FIGS. 3A-3B illustrates a hybrid regulator that includes an SC regulator and an SI regulator connected in series. FIG. 3A includes an SC regulator 322 and an SI regulator 100. The SC regulator 322 can convert the input voltage $V_{IN}$ 104 to $V_{TMP}$ 324. Then the SI regulator 100 can receive $V_{TMP}$ 324 and regulate it to provide $V_{OUT}$ 310 in fine steps using multiple power switches 114, 116 and one or more inductors 108. FIG. 3B illustrates the timing diagram of signals in the regulator.

This hybrid regulator hinges on the fact that SC regulators are good at dividing voltages across predetermined fractional values and that SI regulators are good at regulating across a wide range of conversion ratios of output voltage and input voltage, in fine steps. For example, in a 12V-to-1V step-down regulator, the SC regulator 322 can receive 12V at $V_{IN}$ 104 and provide a ⅙ step-down, thereby providing 2V at $V_{TMP}$ 324. Subsequently, the SI regulator 100 can provide a subsequent regulation to regulate 2V to 1V. Since this regulator reduces the voltage swing at $V_X$ 302 to $V_{TMP}$ 324, which can be substantially less than $V_{IN}$ 104, this regulator can reduce the capacitive power loss due to the parasitic capacitance at the junction 122.

A hybrid regulator, like any other voltage regulators, is coupled to a control system that controls the output voltage of the hybrid regulator. The control system can include a feedback system that controls the hybrid regulator so that the output voltage is within the tolerable error range from the target output voltage.

Figure 4:
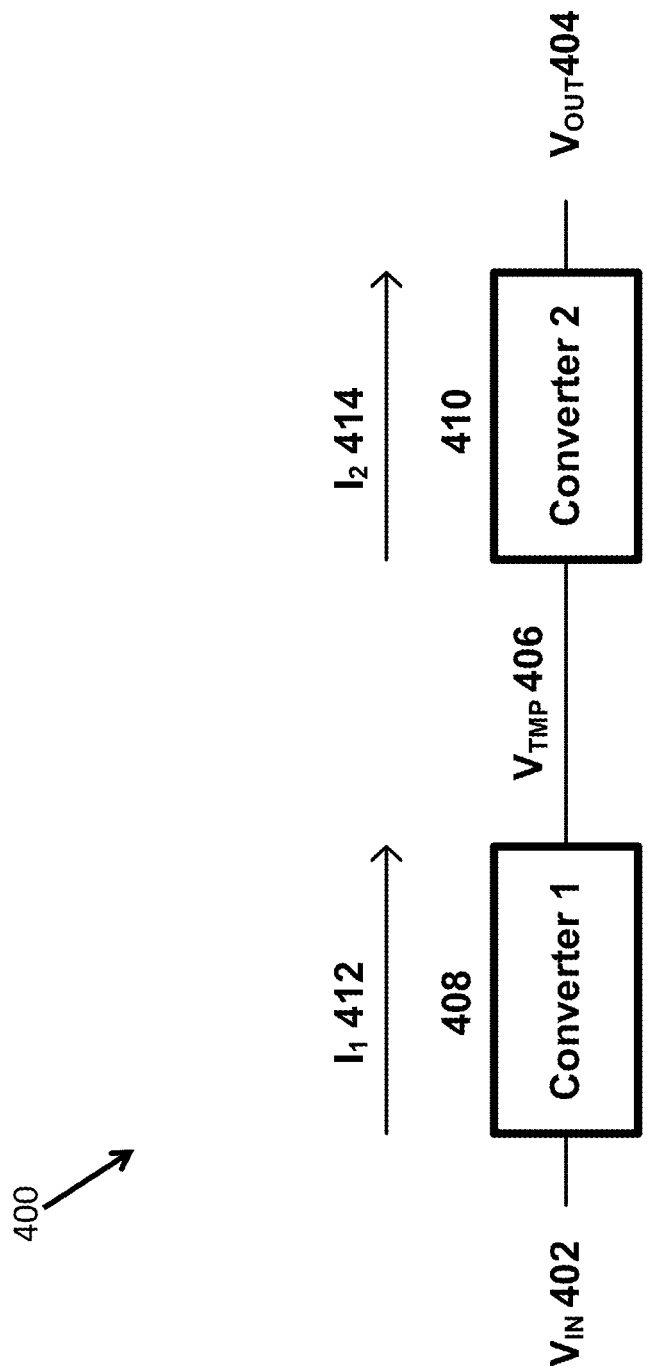
FIG. 4 illustrates a high-level diagram of a hybrid voltage regulator with two converter stages in accordance with some embodiments.

Designing a feedback system for a hybrid regulator can be challenging, even compared to traditional regulators, because there can be a large number of regulators in the hybrid regulator. One challenge unique to controlling a hybrid regulator is that the control system has to balance the current being delivered at each stage of the hybrid regulator. FIG. 4 illustrates a two-stage hybrid regulator in accordance with some embodiments. If the current $I_1$ 412, being delivered through Converter 1 408, is smaller than the current $I_2$ 414 being delivered through Converter 2 410, the output voltage $V_{TMP}$ 406 of Converter 1 408 can keep decreasing and cause a large voltage across Converter 1 408 (i.e., $V_{IN}-V_{TMP}$) and small voltage across Converter 2 410 (i.e., $V_{TMP}-V_{OUT}$). Depending on the intended operating voltage range of the two converter stages 408, 410, both converters can malfunction if $V_{TMP}$ 406 deviates too much from its intended value. On the other hand, if $I_1$ 412 is larger than $I_2$ 414, $V_{TMP}$ 406 can keep increasing and can make both converter stages 408, 410 malfunction. Therefore, the control system has to control both Converter 1 and Converter 2 408, 410 in order to balance the currents $I_1$ 412 and $I_2$ 414. The control system could balance the current across multiple converter stages using a separate feedback system for each converter stage. However, as the number of converters in the hybrid regulator increases, the control system can quickly become very complex.

This disclosure introduces apparatus, systems, and methods for providing a hybrid regulator having a simple feedback system that is capable of balancing current across a plurality of converter stages in the hybrid regulator. The disclosed feedback system can balance the current delivered across multiple converter stages without having a separate feedback system dedicated to each converter stage in the hybrid regulator. To this end, each converter stage in the hybrid regulator can be configured to operate in a mode in which the disclosed feedback system can control the operating frequency of the converter stage to control the amount of current provided by the converter stage.

Figure 5:
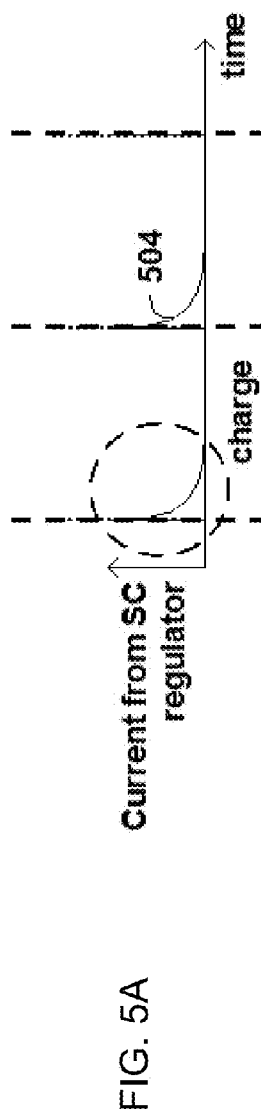
FIGS. 5A-5D illustrate current waveforms of switched-inductor and switched-capacitor regulators in accordance with some embodiments.
Figure 5:
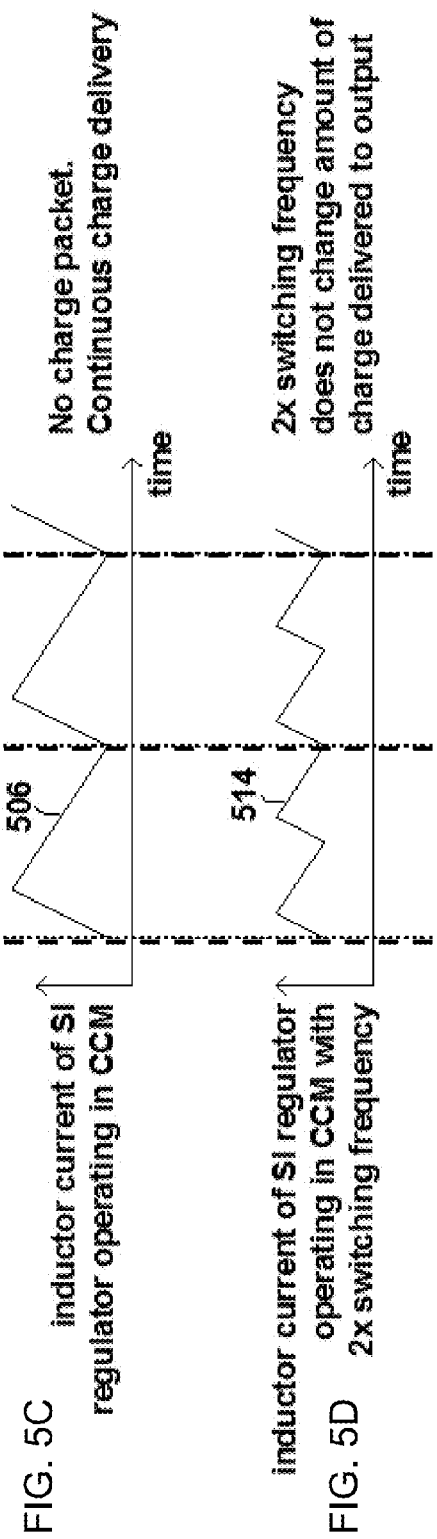

In some embodiments, the hybrid regulator can include a plurality of converter stages, which may include one or more SC converters. In some cases, the output current of the SC converter (e.g., an amount of charge delivered to the output node per unit time) can depend on its operating frequency. For example, as illustrated with respect to FIG. 5A, an SC converter is configured to provide a fixed amount of charge (also referred to as a charge packet or a packet) to an output node within a switching period. Therefore, the output current of the SC converter can be increased with a higher operating frequency (e.g., a shorter switching period); the output current of the SC converter can be reduced with a lower operating frequency (e.g., a longer switching period). In some embodiments, the amount of charge provided to the output by the SC converter can depend on (1) an amount of charge in the charge packet and (2) an operating frequency of the converter (i.e., a frequency at which the charge packet is provided to the output.) In some embodiments, the amount of charge provided to the output by the SC converter is a multiplication of (1) an amount of charge in the charge packet and (2) an operating frequency of the converter (i.e., a frequency at which the charge packet is provided to the output.)

In some embodiments, the SI converter can also be configured so that its output current depends on its operating frequency. For example, the SI converter can be configured to operate in a discontinuous conduction mode (DCM). The DCM refers to an operating mode of an SI converter in which current is delivered to an output in a discontinuous manner. In the DCM, the SI converter can deliver a fixed amount of charge (also referred to as a charge packet or a packet) to an output node within a switching period. For example, the SI converter can deliver a non-zero amount of charge for a first portion of the switching period and deliver zero amount of charge in a second portion of the switching period until the next cycle. Therefore, the SI converter can increase the operating frequency (e.g., reduce the switching period) to deliver more charge (e.g., more current) to the output node or decrease the operating frequency to deliver less charge (e.g., less current) to the output node. In some embodiments, the amount of charge provided to the output by the SI converter in a DCM can depend on (1) an amount of charge in the charge packet and (2) an operating frequency of the converter (i.e., a frequency at which the charge packet is provided to the output.) In some embodiments, the amount of charge provided to the output by the SI converter in a DCM is a multiplication of (1) an amount of charge in the charge packet and (2) an operating frequency of the converter (i.e., a frequency at which the charge packet is provided to the output.)

When all SI converters in a hybrid regulator operates in a DCM, the feedback system of the hybrid regulator can control the operating frequency of converter stages in the hybrid regulator to balance the amount of current provided by each converter stage. As discussed above, the amount of charge provided to the output by the SI converter in a DCM or the SC converter can depend on (1) an amount of charge in the charge packet and (2) an operating frequency of the converter (i.e., a frequency at which the charge packet is provided to the output). Therefore, if the amount of charge in a charge packet of each converter stage is known in advance, then the feedback system can control the operating frequency of the converters to balance the amount of current provided by each converter stage.

For example, if the amount of charge in the charge packet is identical across the converter stages, then the feedback system can provide the same operating frequency to all converter stages to balance the current across the converter stages. As another example, consider a hybrid regulator with four regulators, and the amount of charge per charge packet in each regulator is 1, 2, 3, and 4, respectively. To balance charge across the four converter stages, the feedback system can determine an operating frequency of the four converter stages so that a multiplication of the operating frequency and the charge per packet is identical across the four converter stages. Therefore, the feedback system can determine that the operating frequencies in the four converter stages should be 12f, 6f, 4f, and 3f, where f is a scale factor.

In some embodiments, the feedback system can change the operating frequency of converter stages to change the amount of current provided by the hybrid regulator to the output load. If the output load needs more current than the currently provided amount of current, the feedback system can simply increase the operating frequency of the converters; if the output load needs less current than the currently provided amount of current, the feedback system can decrease the operating frequency of the converters. Referring back to the example above, the feedback system can control the operating frequency of the four converter stages by controlling the value of the single scale factor f. For instance, the feedback system can increase "f" when the output load needs more current; the feedback system can decrease "f" when the output load needs less current. Since the feedback system can control an amount of output current by changing only a single scale factor f, the feedback system can be very simple.

FIG. 5A illustrates a charge transfer operation of an SC regulator in accordance with some embodiments. In some embodiments, the operation of the SC regulator mimics the DCM. For example, when the switching frequency is low enough compared to a time constant of the SC regulator, the output current provided by the SC regulator can be close to zero by the end of the switching cycle (e.g., a beginning of the next switching cycle). As illustrated in FIG. 5A, an SC regulator can deliver a non-zero amount of charge 502 during a first portion of the switching period $T_{SWITCH}$ 512 and deliver a close-to-zero amount of charge during a second portion of the switching period $T_{SWITCH}$ 512. This charge transfer operation can be repeated every switching period $T_{SWITCH}$ 512, as illustrated by another charge packet 504. Therefore, the amount of charge provided by the SC regulator can be controlled by controlling the switching period (i.e., the operating frequency).

FIGS. 5B-5C illustrate a charge transfer operation of an SI regulator in accordance with some embodiments. An SI regulator can operate in one of two modes: a DCM and a continuous conduction mode (CCM). FIG. 5B illustrates the charge transfer operation of an SI regulator in the DCM; FIG. 5C illustrates the charge transfer operation of an SI regulator in the CCM. In a DCM (FIG. 5B), the SI regulator can deliver a non-zero amount of charge 510 through the inductor during a first portion of the predetermined period $T_{SWITCH}$ 512 and deliver zero amount of charge during a second portion of the predetermined period $T_{SWITCH}$ 512.

This charge transfer operation can be repeated every predetermined period $T_{SWITCH}$ 512, as illustrated by another charge packet 508. On the other hand, in a CCM (FIG. 5C), the SI regulator can deliver a non-zero amount of charge through the inductor throughout the entire predetermined period $T_{SWITCH}$ 512 and the current through the inductor does not stay at 0 A.

In some embodiments, the SI regulator can operate in the DCM mode to allow a feedback system to control the amount of output charge of the SI regulator simply by controlling an operating frequency of the SI regulator. The amount of charge delivered in FIGS. 5B-5C can be computed as Q=∫Idt, where I refers to an amount of output current provided by a regulator. For the SI regulator operating in a DCM, the charge is delivered in discrete packets 508, 510, and a predetermined number of packets (e.g., one packet) is delivered every switching period $T_{SWITCH}$ 512. Therefore, the feedback system can control the amount of charge delivered to the output of the SI regulator by changing the switching period $T_{SWITCH}$ 512 of the SI regulator.

In contrast, for an SI regulator operating in a CCM, the charge is delivered continuously. In this case, changing the switching period $T_{SWITCH}$ 512 does not change the amount of charge delivered to the output. For example, as illustrated in FIG. 5D, even when the operating frequency of an SI regulator operating in a CCM is doubled, the amount of charge delivered by the SI regulator to the output remains the same. As a result, for an SI regulator operating in a CCM, the feedback control cannot change the switching frequency to control the amount of charge delivered to the output. Thus, in some embodiments, the SI regulator can operate in a DCM in order to allow the feedback system to control the output current simply by controlling an operating frequency of the SI regulator.

When an SI regulator is operating in a DCM, it can control the shape of the charge packet 510 by adjusting the rise and fall time of the output current. These times are determined by $$I_L = \frac{1}{L}\int V_L dt,$$

where L is the inductance value of the inductor, $I_L$ is the inductor current, and $V_L$ is the voltage applied across the inductor. When there is a constant positive voltage applied across the inductor (e.g., in a buck converter, the voltage of an inductor node coupled to the switches is higher than the voltage of an inductor node coupled to the output), the inductor current increases linearly, which becomes the rising slope of the triangular charge packet 510. When there is a constant negative voltage applied across the inductor (e.g., in a buck converter, the voltage of an inductor node coupled to the switches is lower than the voltage of an inductor node coupled to the output), the inductor current decreases linearly, which becomes the falling slope of the triangular charge packet 510. The shape of the charge packet 510 and amount of charge per packet can be determined by adjusting the voltage applied across the inductor and the time period of applying positive and negative voltages across the inductor.

Figure 6A:
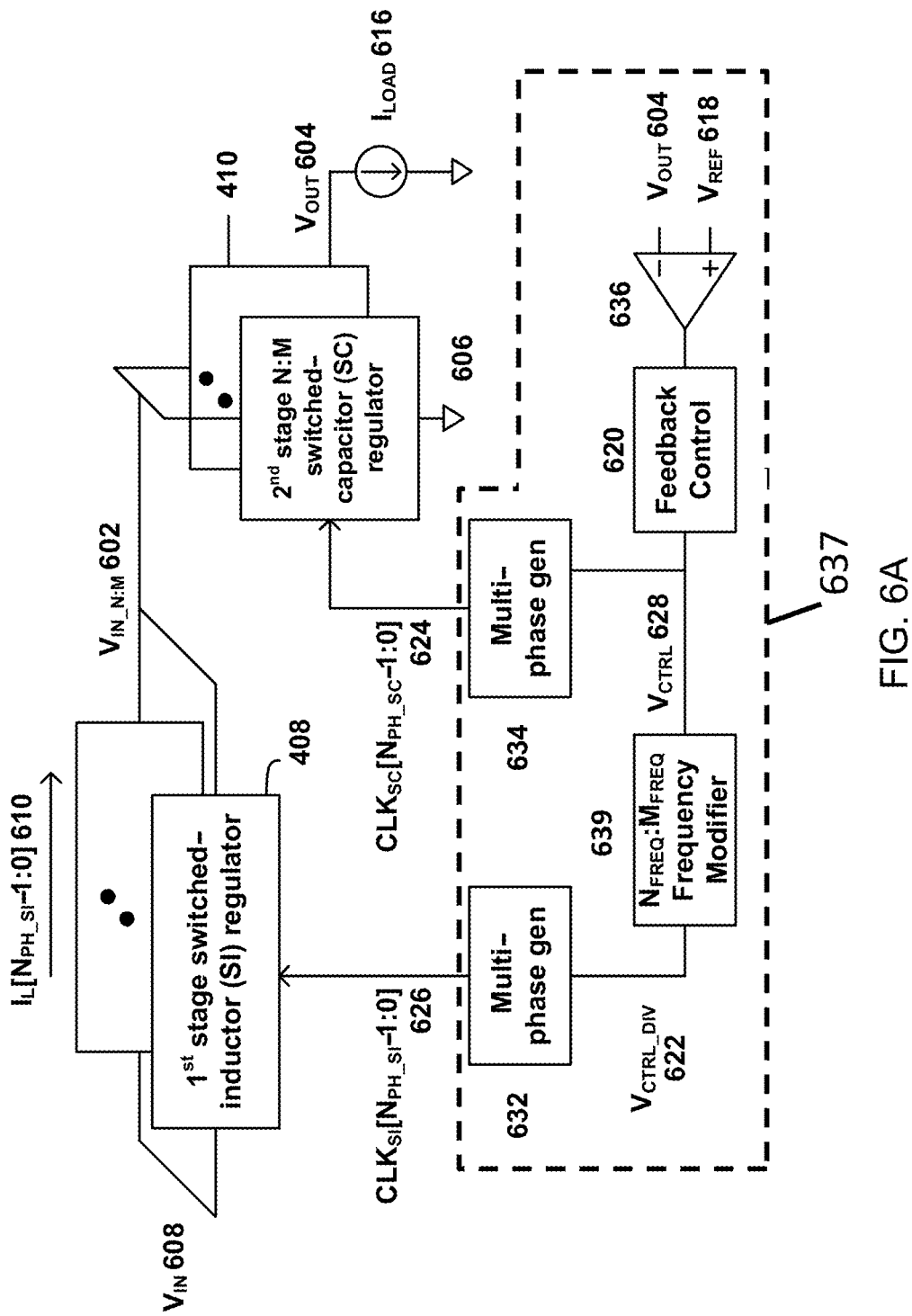
FIGS. 6A-6C illustrate a multi-phase hybrid voltage regulator system and its operation, where the hybrid voltage regulator system includes a first feedback system configured to control the first stage switched-inductor regulator and second stage switched-capacitor regulator in accordance with some embodiments.

FIG. 6A illustrates a hybrid regulator system in accordance with some embodiments. The hybrid regulator system includes a hybrid regulator 400 having a 1$^{st}$ stage SI regulator 408 and a 2$^{nd}$ stage SC regulator 410, and a feedback system 637. In some embodiments, one or more of the SI regulator 408 and SC regulators 410 can be a single-phase regulator. In other embodiments, one or more of the SI regulator 408 and SC regulators 410 can be a multi-phase regulator having a plurality of regulator cells, where each regulator cell includes circuit elements that can independently convert an input voltage to an output voltage. The number of regulator cells in a multi-phase regulator can be equivalent to the number of phases provided by the multi-phase regulator. $N_{PH\_SI}$ and $N_{PH\_SC}$ indicate the number of phases of the SI regulator and the SC regulator, respectively, where $N_{PH\_SI}$ and $N_{PH\_SC}$ can be any number from larger or equal to 1 with typical values ranging from 1 to 100. The regulator cells can be independently operated by clock signals that are out-of-phase from one another. For example, a first regulator of the multi-phase regulator cell can receive a first clock signal and a second regulator cell of the multi-phase regulator can receive a second clock signal, where the first clock signal and the second clock signal have the same frequency and are out of phase, for instance, by 180 degrees.

The feedback system 637 can include one or more of a feedback control 620, a frequency modifier 639, and, in case the regulators in the hybrid regulator are multi-phase, multi-phase signal generators 632, 634. The frequency modifier 639 can include a frequency divider that receives a first periodic signal having a first frequency and generates a second periodic signal having a second frequency. The frequency divider can include a regenerative frequency divider, an injection-locked frequency divider, a digital divider, or a sigma-delta fractional-N synthesizer. The frequency modifier 639 can be configured to receive an input periodic signal and provide an output periodic signal. The frequency of the output periodic signal can be a fractional multiple of the frequency of the input periodic signal. For example, the frequency of the output periodic signal can be ½ of the frequency of the input periodic signal; the frequency of the output periodic signal can be ⅗ of the frequency of the input periodic signal; the frequency of the output periodic signal can be 7/5 of the frequency of the input periodic signal; the frequency of the output periodic signal can be identical to the frequency of the input periodic signal; or the frequency of the output periodic signal can be twice the frequency of the input periodic signal.

Figure 6B:
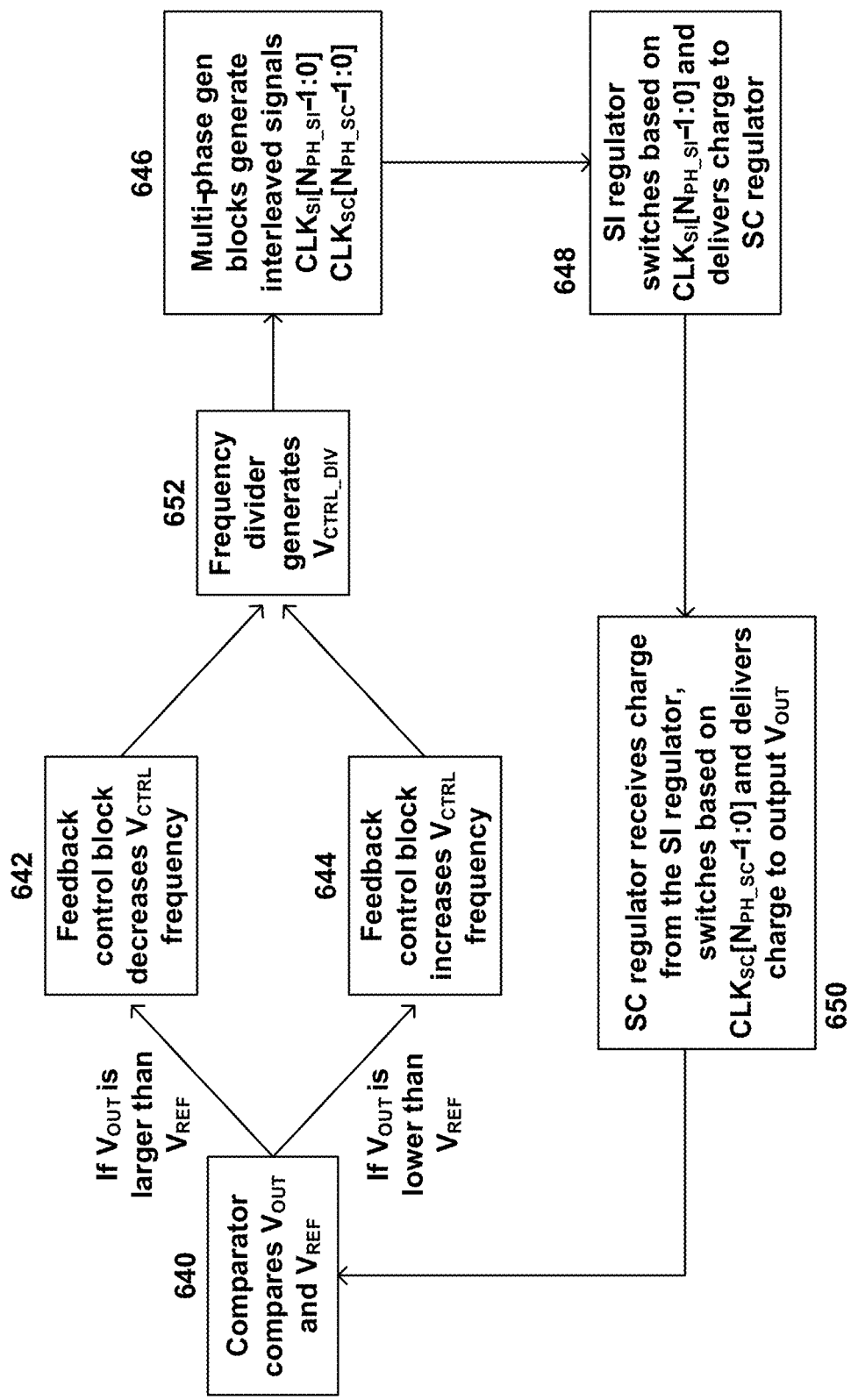

FIG. 6B illustrates a flow diagram that illustrates an operation of the hybrid regulator system of FIG. 6A in accordance with some embodiments. In step 640, a comparator 636 can determine whether $V_{OUT}$ 604 is larger or smaller than $V_{REF}$ 618, which is the target output voltage $V_{TARGET}$ of the hybrid regulator. In steps 642/644, based on the result of the comparison in step 640, the feedback control block 620 can adjust the frequency of $V_{CTRL}$ 628, where $V_{CTRL}$ 628 is a clock signal that determines the operating frequencies of the SI regulator 408 and SC regulator 410. If $V_{OUT}$ 604 is larger than $V_{REF}$ 618, the feedback control block 620 decreases the frequency of $V_{CTRL}$ 628. If $V_{OUT}$ 604 is smaller than $V_{REF}$ 618, the feedback control block 620 increases the frequency of $V_{CTRL}$ 628. The feedback control block 620 can implement a linear control scheme, a non-linear control scheme, a lower-bound control scheme, a proportional-integral-derivative (PID) control scheme, or any other suitable control schemes for controlling the hybrid regulator. The feedback control block 620 can include an oscillator, such as a voltage controlled oscillator, that is configured to generate a periodic signal based on the difference between the $V_{OUT}$ 604 and the $V_{REF}$ 618.

In step 652, the frequency divider 639 can receive $V_{CTRL}$ 628 and generate $V_{CTRL\_DIV}$ 622, which is a frequency divided version of $V_{CTRL}$ 628 having a different frequency compared to $V_{CTRL}$ 628. In some embodiments, where the SC regulator 410 and SI regulator 408 can operate at the same frequencies (i.e., an amount of charge in the charge packet of the SI regulator is identical to an amount of charge in the charge packet of the SC regulator), the frequency divider 639 can be removed from the feedback system 637, in which case $V_{CTRL\_DIV}$ 622 is identical to $V_{CTRL}$ 628.

In step 646, based on the clock signals $V_{CTRL}$ 628 and $V_{CTRL\_DIV}$ 622, multi-phase generators 632, 634 can generate interleaved signals $CLK_{SI}[N_{PH\_SI}-1:0]$ 626 and $CLK_{SC}[N_{PH\_SC}-1:0]$ 624 that drive multiple phases of the SI regulator 408 and SC regulator 410, respectively. In some embodiments, where the SC regulator 410 and the SI regulator 408 are single-phase regulators, the multi-phase generator blocks 632 634 can be removed, and the method steps 646 and 648 can be skipped.

In step 648, based on $CLK_{SI}[N_{PH\_SI}-1:0]$ 626, the SI regulator 408 can deliver charge packets to the $2^{nd}$ stage SC regulator via the node $V_{IN\_N:M}$ 602, which is the input of the $2^{nd}$ stage SC regulator 410. In step 650, the $2^{nd}$ stage SC regulator 410 can receive charges from the SI regulator 408 and switches the capacitors in the SC regulator 410 based on $CLK_{SC}[N_{PH\_SC}-1:0]$ 624 to deliver current to the output $V_{OUT}$ 604, which is sent to the comparator 636 to go back to the first step 640. If the charge per packet and switching frequencies of the SI regulator 408 and SC regulator 410 are identical, the charge delivered by the two regulators 410, 408 can be balanced and $V_{IN\_N:M}$ 602 can stay at a predetermined value.

Following these steps, the feedback can regulate the output voltage $V_{OUT}$ 604 to be within a tolerance range of the reference voltage $V_{REF}$ 618. The tolerance range of the hybrid regulator can be predetermined. The tolerance range of the hybrid regulator can be ±0.1-5% of the target voltage in steady state and ±5-20% during load transient events when the load current fluctuates. If the output voltage $V_{OUT}$ 604 drops below the reference voltage $V_{REF}$ 618 due to a surge in load current 616, the feedback system increases the operating frequencies of the SI regulator 408 and SC regulator 410 to increase the amount of current provided to the output $V_{OUT}$ 604 to increase $V_{OUT}$ 604. As discussed above, the increase in the operating frequencies of the converter stages increases the delivered current because charge packets, having a fixed amount of charge, are delivered to the output more frequently. On the other hand, if the output voltage $V_{OUT}$ 604 spikes over the reference voltage $V_{REF}$ 618 due to a drop in load current 616, the feedback system decreases the operating frequencies of the SI regulator 408 and SC regulator 410 to reduce the current provided to the output $V_{OUT}$ 604.

Figure 6C:
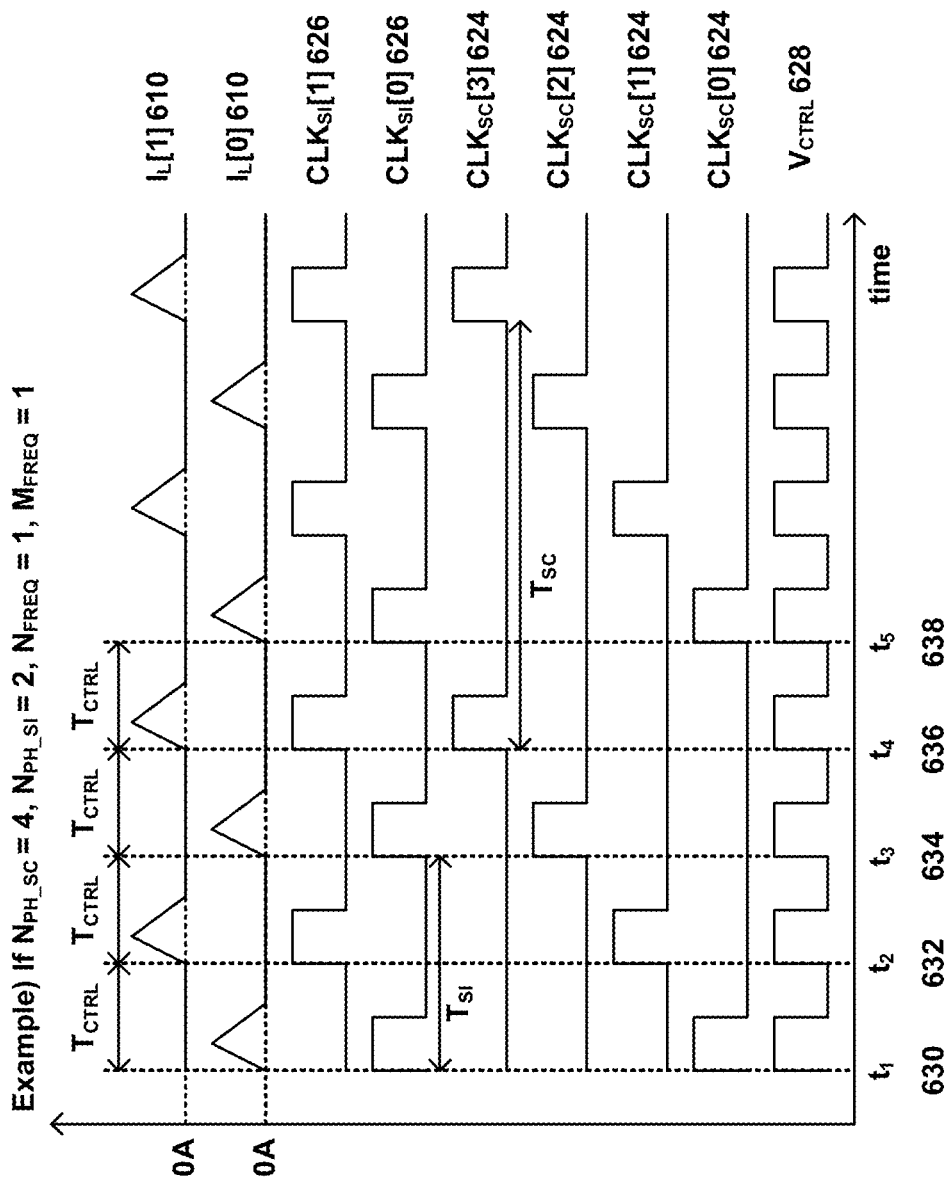

FIG. 6C shows a signal diagram that illustrates how the feedback system regulates the output voltage in accordance with some embodiments. For this particular illustration, the number of phases in the SI regulator 408 ($N_{PH\_SI}$) is 2; the number of phase in the SC regulator 410 ($N_{PH\_SC}$) is 4; and the ratio of operating frequencies of the SI regulator 408 and the SC regulator 410 ($N_{FREQ}:M_{FREQ}$) is 1:1. Since $N_{FREQ}:M_{FREQ}$ is 1:1, FIG. 6C illustrates a scenario in which the feedback system does not include the frequency divider block 639.

As provided in the previous paragraph, $V_{CTRL}$ 628 is a clock signal with a frequency set by the feedback control block 620. The multi-phase generator blocks 632, 634 generate clock signals $CLK_{SI}[N_{PH\_SI}-1:0]$ 626 and $CLK_{SC}[N_{PH\_SC}-1:0]$ 624 that are interleaved by 180 degrees and 90 degrees, respectively, based on $V_{CTRL}$ 628.

At time $t_1$ 630, $V_{CTRL}$ 628 has a first rising edge, which triggers $CLK_{SI}[0]$ 626 and $CLK_{SC}[0]$ 624. These are signals that control the phases of SI regulator 408 and SC regulator 410, respectively. When $CLK_{SI}[0]$ 62 is triggered, the first phase of the SI regulator 408 switches to deliver a packet of charge, creating a triangular waveform on $I_L[0]$ 610.

At time $t_2$ 632, $V_{CTRL}$ 628 has a second rising edge, which triggers the signals $CLK_{SI}[1]$ 626 and $CLK_{SC}[1]$ 624 that control the second phases of the SI regulator 408 and SC regulator 410, respectively. $CLK_{SI}[1]$ 626 is 180 degrees out of phase from $CLK_{SI}[0]$ 626 and $CLK_{SC}[1]$ 624 is 90 degrees out of phase from $CLK_{SC}[0]$ 624. Controlled by $CLK_{SI}[1]$ 626, the second phase of the SI regulator 408 switches to deliver a packet of charge, creating a triangular waveform on $I_L[1]$ 610.

At time $t_3$ 634, $V_{CTRL}$ 628 has a third rising edge, which triggers signals $CLK_{SI}[0]$ 626 and $CLK_{SC}[2]$ 624 that control the first phase of the SI regulator 408 and the third phase of the SC regulator 410, respectively. Note that since the SI regulator 408 only has 2 phases, it has now come back to the first phase and delivers a charge packet through $I_L[0]$ 610.

At time $t_4$ 636, $V_{CTRL}$ 628 has a fourth rising edge, which triggers signals $CLK_{SI}[1]$ 626 and $CLK_{SC}[3]$ 624 that control the second phase of the SI regulator 408 and the fourth phase of the SC regulator 410, respectively. From time $t_5$ 638, the feedback system repeats the process of time instances $t_1$-$t_4$.

In some embodiments, the first converter stage of the hybrid regulator can include an SI regulator and the second converter stage of the hybrid regulator can include an SC regulator. In other embodiments, the first converter stage of the hybrid regulator can include an SC regulator and the second converter stage of the hybrid regulator can include an SI regulator.

In some embodiments, in addition to the feedback system that balances the delivered charge across all converter stages to regulate the output voltage, the hybrid regulator system can include another feedback system that is configured to operate the SC regulator 410 at a configuration at which the SC regulator 410 can achieve a high efficiency.

In ideal cases, the SC regulator 410 is able to step down the input voltage $V_{IN\_N:M}$ 602 to an output voltage $V_{OUT}$ 604, where the value of the output voltage $V_{OUT}$ 604 is $$\frac{M}{N}V_{IN_{N:M}}.$$

However, in practice, the output voltage $V_{OUT}$ 604 can be limited to $$\frac{M}{N}V_{IN_{N:M}} - V_{SC\_DROP}$$

(i.e., the maximum output voltage of the SC regulator 410 is limited to $$\frac{M}{N}V_{IN_{N:M}} - V_{SC\_DROP}),$$

where $V_{SC\_DROP}$ is a parasitic voltage drop caused by various non-ideal effects, such as a parasitic resistance of switches. Oftentimes $V_{SC\_DROP}$ can be substantially small compared to the output voltage $V_{OUT}$ 604 (e.g., 0-200 mV in a 90 nm process).

The control system of the SC regulator 410 can anticipate that the output voltage of the SC regulator 410 cannot be exactly $$\frac{M}{N} V_{IN_{N:M}}.$$

Therefore, instead, the control system of the SC regulator 410 can set the target output voltage 604 of the SC regulator as $$V_{TARGET} = \frac{M}{N} V_{IN_{N:M}} - V_{T\_DROP},$$

where $V_{T\_DROP}$ is the target voltage drop.

As $V_{T\_DROP}$ is set to a value close to 0V, it becomes increasingly difficult for the SC regulator to match the target output voltage $V_{TARGET}$ because the actual voltage drop $V_{SC\_DROP}$ can be greater than the target voltage drop $V_{T\_DROP}$ in which case the maximum output voltage of the SC regulator (i.e., $$\left(i.e., \frac{M}{N} V_{IN_{N:M}} - V_{SC\_DROP}\right)$$

can be less than the target output voltage $$V_{TARGET} = \frac{M}{N} V_{IN_{N:M}} - V_{T\_DROP}.$$

For example, consider a case where the SC regulator is a 2:1 regulator and the input voltage $V_{IN_{N:M}}$ is 2V. Ideally, the output voltage $V_{OUT}$ can be 1V and the parasitic voltage drop $V_{SC\_DROP}$ can be 0V. However, if the parasitic resistance of switches is 0.1Ω and the load current is 1 A, the parasitic voltage drop from the parasitic resistance is 0.1V. Therefore, the maximum output voltage of the SC regulator is 0.9V. In this case, unless the target voltage drop $V_{T\_DROP}$ is equal to or higher than 0.1V, the SC regulator cannot match the target voltage $V_{TARGET}$. This problem becomes more pronounced as the parasitic resistance increases or the load current increases. As a result, when target voltage drop $V_{T\_DROP}$ is set at a large value, it becomes easier to guarantee a proper regulation of the output voltage across a wide range of parasitic values and load current. On the other hand, the efficiency of the SC regulator degrades as the target voltage drop $V_{T\_DROP}$ increases as the output $V_{OUT}$ 604 deviates from $$\frac{M}{N} V_{IN_{N:M}}.$$

Therefore, there is a trade-off between ease of regulation and conversion efficiency. Thus, it is desirable to set the target voltage drop $V_{T\_DROP}$ so that it is large enough to regulate the output properly while small enough to reduce efficiency degradation. The second feedback system of the hybrid regulator can be configured to set the target voltage drop $V_{T\_DROP}$ so that it is large enough to regulate the output properly while small enough to reduce efficiency degradation.

Figure 7A:
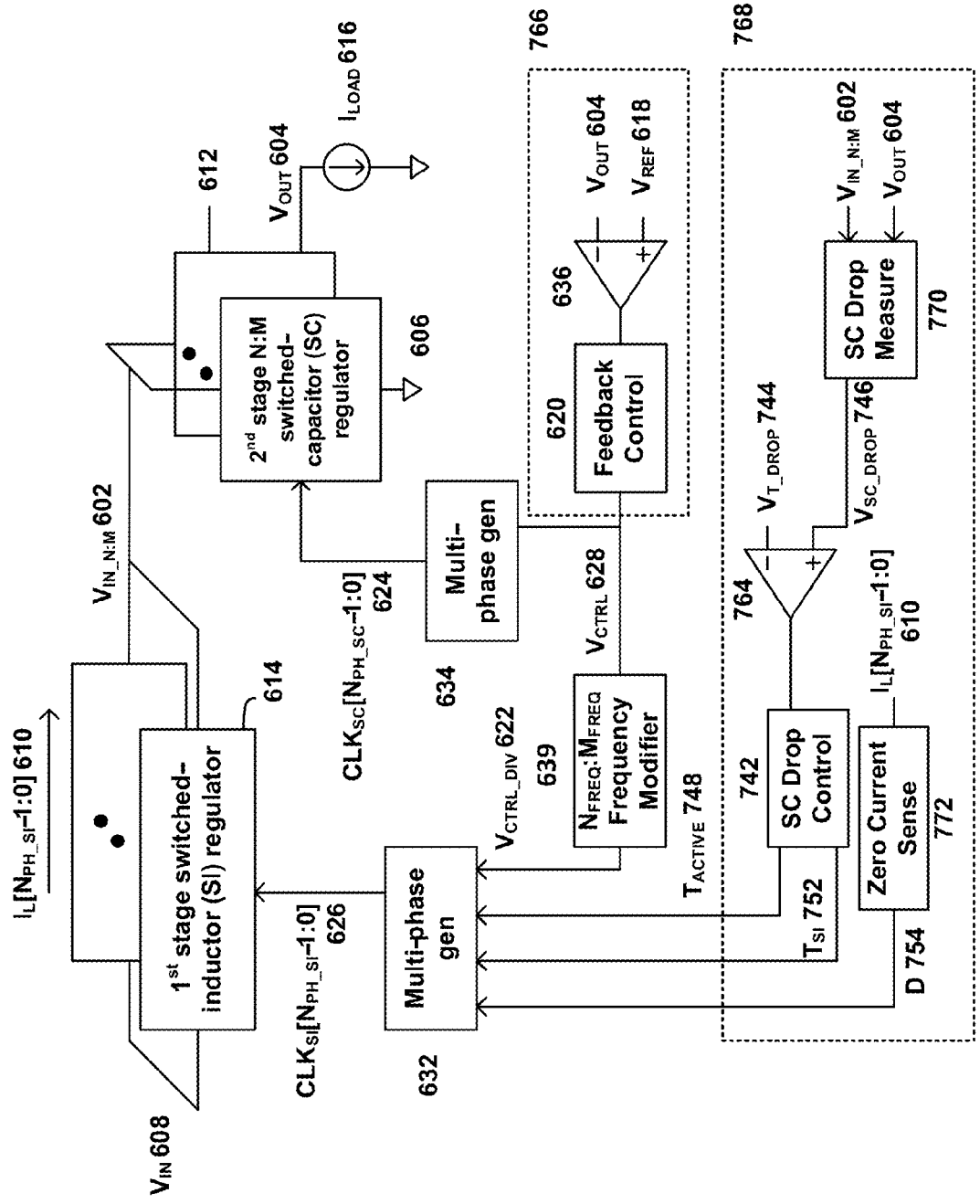
FIGS. 7A-7C illustrate a multi-phase hybrid voltage regulator system and its operation, where the hybrid voltage regulator system includes the first feedback system and the second feedback system configured to improve the efficiency of the second-stage switched-capacitor regulator in accordance with some embodiments.

FIG. 7A illustrates a hybrid regulator system having a second feedback system in accordance with some embodiments. Compared to FIG. 6A, the hybrid regulator system includes, in addition to the hybrid regulator 400 and the first feedback system 637, a second feedback system 768 that adjusts parameters of the SI regulator 408 to increase the regulator efficiency 768.

The goal of the second feedback system 768 is to keep the parasitic voltage drop $V_{SC\_DROP}$ 746 within a tolerance range of the target voltage drop $V_{T\_DROP}$ 744, which is typically 0 to 0.2V, to increase the SC regulator efficiency. Since the conversion ratio of the SC regulator (i.e., N and M) is known and $V_{OUT}$ 604 is regulated by the first feedback system, the second feedback system 768 can control $V_{SC\_DROP}$ 746 of the SC regulator 410 by adjusting $V_{IN\_N:M}$ 602.

To adjust $V_{IN\_N:M}$ 602, the second feedback system 768 can control an amount of current provided to the input of the SC regulator 410. The second feedback system 768 can control an amount of current provided to the input of the SC regulator 410 by adjusting parameters of the SI regulator 408.

Figure 7B:
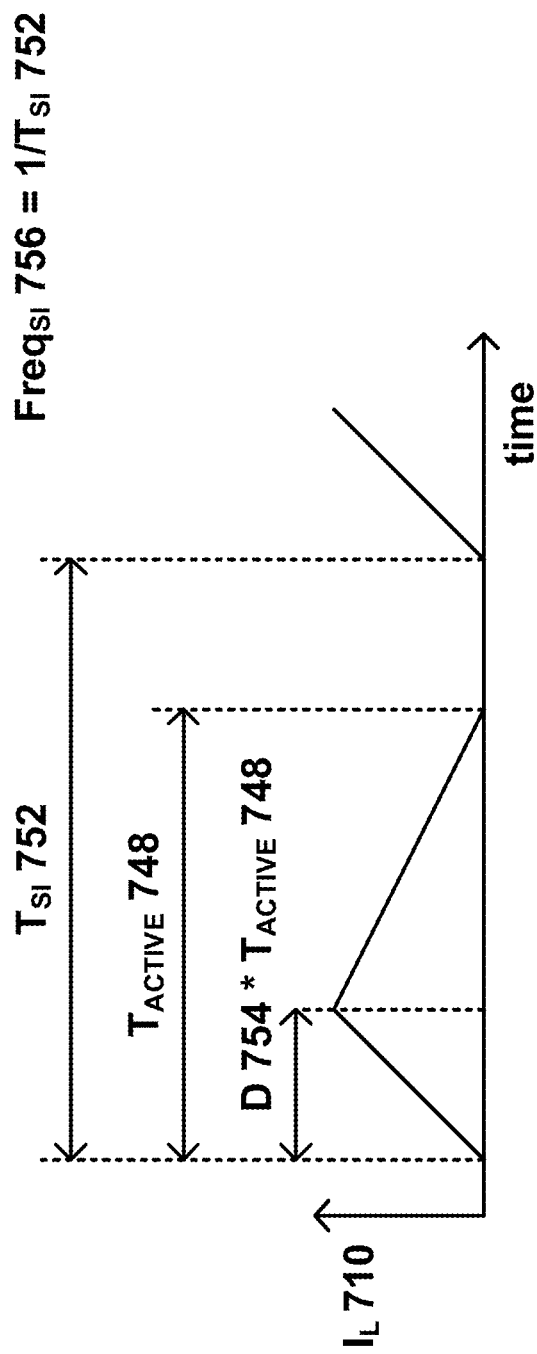

FIG. 7B illustrates parameters of the SI regulator 408 adjusted by the second feedback system 768 in accordance with some embodiments. The adjusted parameters of the SI regulator 408 can include a switching period $T_{SI}$ 752 (or Freq$_{SI}$ 756, whim is equal to $$\left(\text{or Freq}_{SI} \text{ 756, which is equal to } \frac{1}{T_{SI}}\right),$$

which controls an operating frequency of the SI regulator 408; an active period $T_{ACTIVE}$ 748, which indicates a portion of $T_{SI}$ 752 during which the SI regulator provides current to the SC regulator; and a duty cycle D 754 that defines a portion of the active period $T_{ACTIVE}$ 748 during which the SI regulator increases the current provided to the SC regulator. To increase $V_{IN\_N:M}$ 602, the second feedback system 768 can cause the SI regulator 408 to deliver more charge to $V_{IN\_N:M}$ 602 by increasing $T_{ACTIVE}$ 748, duty cycle D 754, and/or Freq$_{SI}$ 756. To decrease $V_{IN\_N:M}$ 602, the second feedback system 768 can cause the SI regulator 408 to deliver less charge to $V_{IN\_N:M}$ 602 by decreasing $T_{ACTIVE}$ 748, duty cycle D 754, and/or Freq$_{SI}$ 756.

In some embodiments, the second feedback system 768 can control the duty cycle D 754 using a zero current sense block 772. The zero current sense block 772 can be configured to sense a time instance at which the inductor current of the SI regulator $I_L$ 710 reaches 0 A, and at that time instance, the zero current sense block 772 can be further configured to prevent the inductor current from flowing through the inductor by disconnecting the inductor from one or more nodes that provide current to the inductor. In some embodiments, the zero current sense block 772 can include (1) a resistor in series with the inductor and (2) a voltage comparator that detects a voltage induced by the inductor current across the resistor. In such embodiments, the resistor can be the inherent resistive component (e.g., equivalent series resistance (ESR)) of the inductor. In other embodiments, the resistor can have a low resistance in order to reduce power dissipation across the resistor. Other types of zero current sense block 772, which are readily available to a person of ordinary skill in the art, are also contemplated.

Figure 7C:
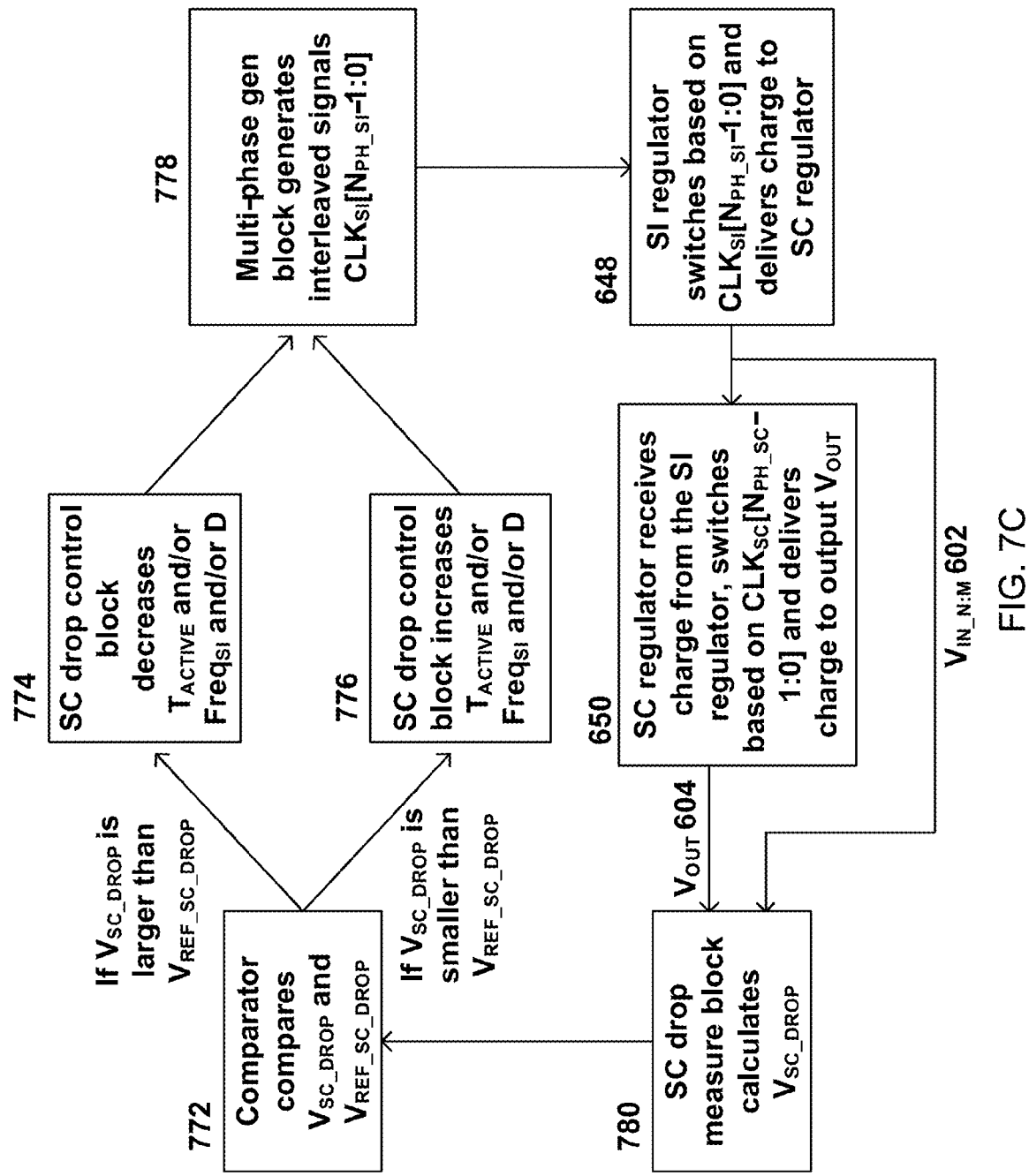

FIG. 7C illustrates a flow diagram of the hybrid regulator and the second feedback system. The flow diagram describes how the second feedback control system 768 controls $V_{SC\_DROP}$ 746 to increase the efficiency of the hybrid regulator.

In step 772, the comparator 764 in the second feedback system 768 determines whether $V_{SC\_DROP}$ 746 is larger or smaller than $V_{T\_DROP}$ 744, which is the target value of $V_{SC\_DROP}$ 746 predetermined by the hybrid regulator. Subsequently, based on the result of the comparison, the SC drop control block 742 adjusts $T_{ACTIVE}$ 748, duty cycle D 754, and/or $Freq_{SI}$ 756. For example, if $V_{SC\_DROP}$ 746 is larger than $V_{T\_DROP}$ 744, then, in step 774, the SC drop control block 742 increases one or more of the three parameters—$T_{ACTIVE}$ 748, duty cycle D 754, and $Freq_{SI}$ 756. On the other hand, if $V_{SC\_DROP}$ 746 is smaller than $V_{T\_DROP}$ 744, then, in step 776, the SC drop control block 742 decreases one or more of the three parameters—$T_{ACTIVE}$ 748, duty cycle D 754, and $Freq_{SI}$ 756. The SC drop control block 742 can be implemented as a finite-state-machine (FSM).

In step 778, based on the clock signals $V_{CTRL}$ 628 and $V_{CTRL\_DIV}$ 622, the multi-phase generator 632 can generate interleaved signals $CLK_{SI}[N_{PH\_SI}-1:0]$ 626 that drive multiple phases of the SI regulator 408.

Subsequently, in step 648, as discussed above, the SI regulator 408 delivers charge packets to $V_{IN\_N:M}$ 602 based on $CLK_{SI}[N_{PH\_SI}-1:0]$ 626. In step 650, as discussed above, the SC regulator 410 receives charge from the SI regulator 408 and switches based on $CLK_{SC}[N_{PH\_SC}-1:0]$ 624 to deliver charge to the output $V_{OUT}$ 604.

In step 780, based on $V_{OUT}$ 604, $V_{IN\_N:M}$ 602 and the equation $$V_{OUT} = \frac{M}{N} V_{IN\_N:M} - V_{SC\_DROP},$$

the SC drop measure block 770 calculates $V_{SC\_DROP}$ 746 and provides it to the comparator 764 so that the comparator can iterate the process again from step 772.

Although FIGS. 4-7 illustrates feedback systems for a two stage hybrid regulator, the disclosed feedback systems can be applied to any type of hybrid regulators as generally illustrated in FIG. 2.

Figure 8:
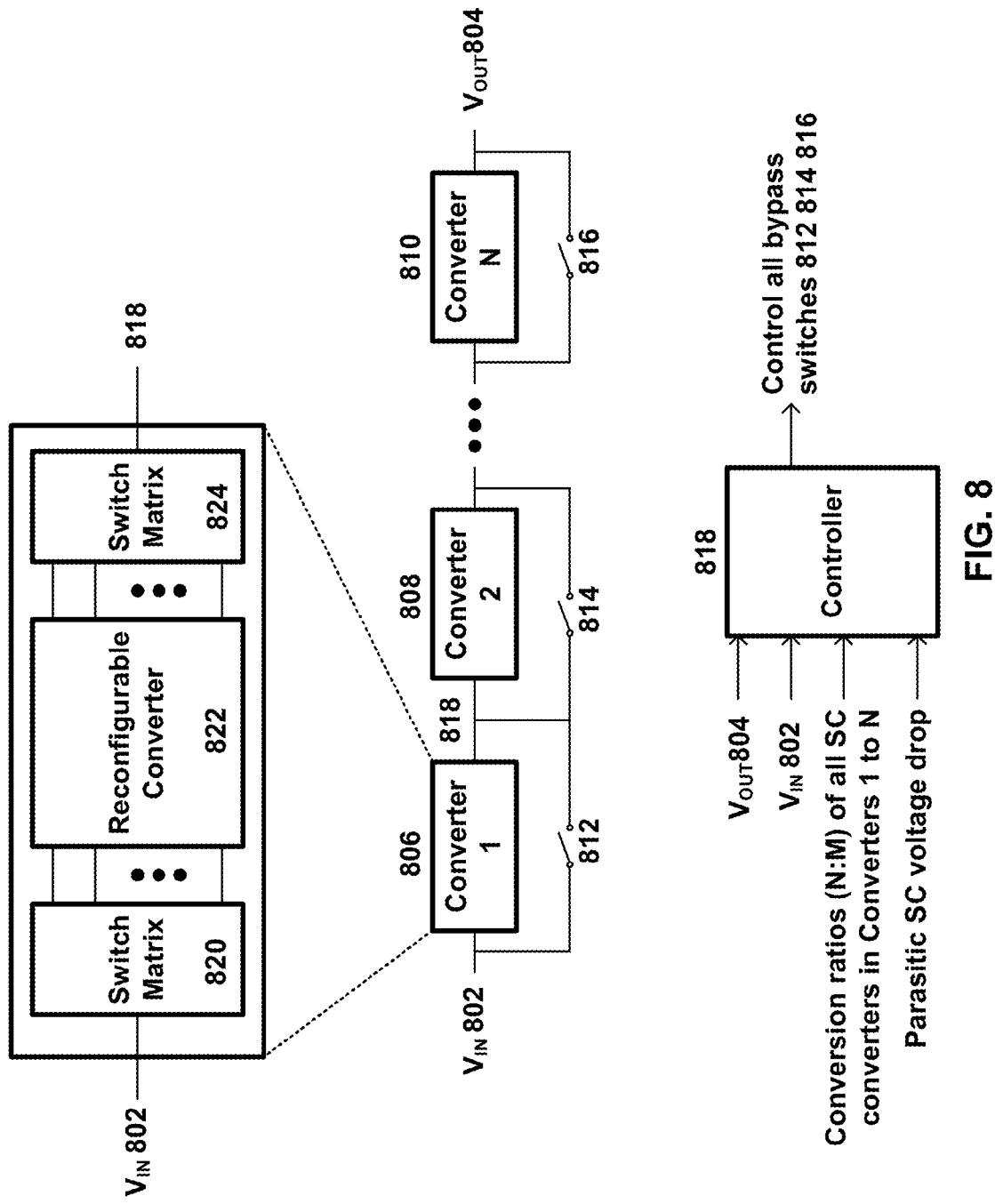
FIG. 8 illustrates a hybrid regulator system in which bypass switches can turn on to bypass certain converter stages in accordance with some embodiments.

In some embodiments, the hybrid regulator can include bypass switches coupled to one or more converter stages so that certain converters can be dynamically bypassed to improve the efficiency of the hybrid regulator. FIG. 8 illustrates a hybrid regulator with bypass switches in accordance with some embodiments. FIG. 8 includes a plurality of voltage converter stages 806, 808, . . . , 810, and bypass switches 812, 814, . . . , 816.

Suppose that $V_{IN}$ 802 is 12V, the converter 1 806 is a 6:1 SC regulator and the target output $V_{OUT}$ 804 is 1.9V. Recall that $$V_{OUT} = \frac{M}{N} V_{IN\_N:M} - V_{SC\_DROP},$$

where $V_{IN\_NM}$ is the input and $V_{OUT}$ is the output of an SC regulator. The output of converter 1 818 can be a value very close to 12V divided by 6, which is 2V. Assuming $V_{SC\_DROP}$ is 0.1V, which is acceptable for maintaining a high (i.e. up to 95%) efficiency of the SC regulator, the remaining converters (i.e., converter 2 808 and converter N 810) can be bypassed to directly connect the output of converter 1 818 to the output $V_{OUT}$ 804. In this case, the switch 812 is "off" or disconnected and the remaining switches 814 816 are "on" or connected to bypass converter 2 and converter N.

As another example, suppose that the target output voltage $V_{OUT}$ 804 is 0.75V, and the input voltage $V_{IN}$ 802 is 12V, and the converter 2 808 is a 2:1 SC regulator. One way to deliver the target output $V_{OUT}$ 804 is to use the same 6:1 SC regulator (converter 1 818) in the previous case. In this case, $V_{SC\_DROP}$ becomes 1.25V since $V_{OUT}$ 804 is 0.75V, instead of 1.9V. Because $V_{SC\_DROP}$ is large, the conversion efficiency of the hybrid regulator degrades significantly (i.e. the efficiency is limited to 37.5%, which is 0.75/2.0). A better way is to use two converters (e.g., the converter 1 and the converter 2) in series instead of just converter 1. Since the converter 2 808 is a 2:1 SC regulator, the output of converter 1 818 can be 1.9V, and the output of converter 2 808 can be $$\frac{1.9}{2} - 0.1 = 0.75 \text{ V},$$

assuming $V_{SC\_DROP}$ of the converter 1 808 and the converter 2 818 is 0.1V. This way, $V_{SC\_DROP}$ is limited to a small value for both the converter 1 and the converter 2, and the conversion efficiency for both converters can be high (i.e. up to 83.8% in this example). To enable this configuration, switches 812 and 814 are "off" and the remaining switches 816 are "on" to bypass the rest of the converters except converters 1 and 2.

In some embodiments, each converter stage can include a reconfigurable converter 822 (e.g., an SC converter that can reconfigure its step-down ratio across values such as 2:1, 3:1, 4:1, 5:1) that has multiple inputs and outputs, and one or more switch matrices 820 824 that can choose an input and an output from those multiple signals. For example, the reconfigurable converter 822 can receive, as input voltages, 4V and 6V, and provide, as output voltages, 1V and 2V. The reconfigurable converter 822 can be reconfigured across conversion ratios of 4:1, 6:1, 2:1, 3:1, depending on the desired input and output values.

In some embodiments, the control of the bypass switches 812, 814, 816 can be performed by a controller 818. For example, the controller 818 can determine the status of the bypass switches 812, 814, 816, for instance, whether one or more of the bypass switches are "on" or "off." The controller 818 can determine the status of the bypass switches 812, 814, 816 based on one or more of: $V_{IN}$ 802, $V_{OUT}$ 804, the conversion ratios of all SC regulator stages in the hybrid regulator, and the parasitic SC voltage drops of SC converter stages in the hybrid regulator.

In some embodiments, the controller 818 can determine the status of the bypass switches 812, 814, 816 using a lookup table. The lookup table can list which switches should be turned on for various $V_{IN}$ 802 and $V_{OUT}$ 804 values. FIG. 9 illustrates the lookup table for controlling the bypass switches in accordance with some embodiments. This lookup table 902 is configured to control a hybrid regulator having 3 converter stages, where converter 1 is a 2:1 SC converter, converter 2 is a 3:1 SC converter, and converter 3 is an SI converter, and 0V parasitic SC voltage drop. In some cases, the controller 818 can be a part of the first feedback system 637 or a part of the second feedback system 768.

In some embodiments, the bypass switches 812, 814, 816 can be arranged serially, as illustrated in FIG. 8. In some cases, each bypass switch in a serial arrangement can be configured to couple an input node and an output node of a single converter stage. In other cases, each bypass switch in a serial arrangement can be configured to couple an input node of a first converter stage and an output node of a second converter stage. For example, one bypass switch can be configured to couple an input node of the converter 1 806 and the output node of the converter 2 808. In some embodiments, the bypass switches can be arranged as a switch matrix that collectively couples an input node of one converter stage and an output node of another converter stage. In some embodiments, the bypass switches can be arranged as a tree of switches that collectively couples an input node of one converter stage and an output node of another converter stage.

Figure 10:
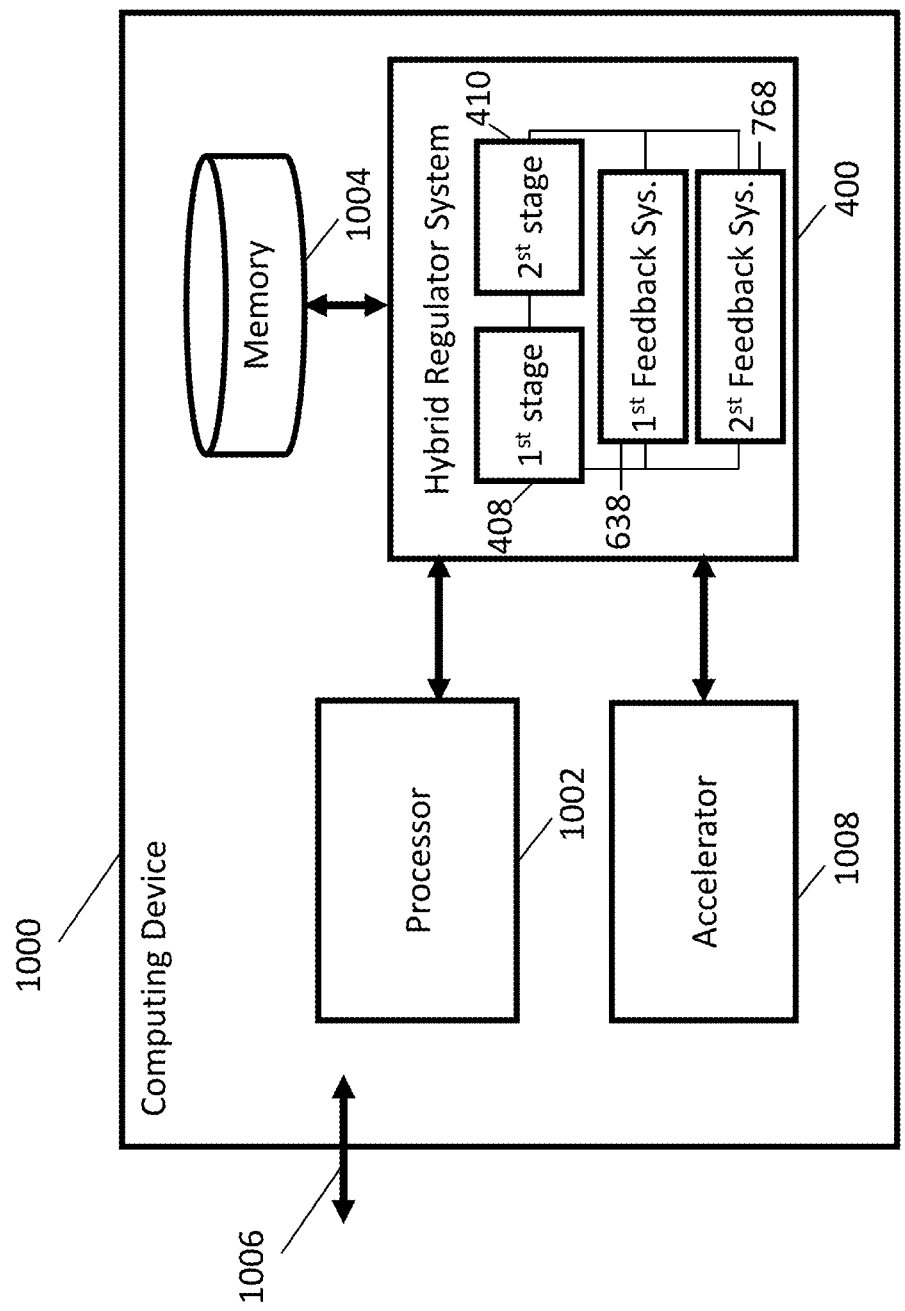
FIG. 10 shows a block diagram of a computing device in accordance with some embodiments.

The disclosed apparatus and systems can include a computing device. FIG. 10 is a block diagram of a computing device in accordance with some embodiments. The block diagram shows a computing device 1000, which includes a processor 1002, memory 1004, one or more interfaces 1006, an accelerator 1008, and a hybrid regulator system 400 having a plurality of converter stages, including the first stage converter 408 and the second stage converter 410, the first feedback system 637, and the second feedback system 768. The computing device 1000 may include additional modules, fewer modules, or any other suitable combination of modules that perform any suitable operation or combination of operations.

The computing device 1000 can communicate with other computing devices (not shown) via the interface 1006. The interface 1006 can be implemented in hardware to send and receive signals in a variety of mediums, such as optical, copper, and wireless, and in a number of different protocols, some of which may be non-transient.

In some embodiments, the accelerator 1008 can be implemented in hardware using an application specific integrated circuit (ASIC). The accelerator 1008 can be a part of a system on chip (SOC). In other embodiments, the accelerator 1008 can be implemented in hardware using a logic circuit, a programmable logic array (PLA), a digital signal processor (DSP), a field programmable gate array (FPGA), or any other integrated circuit. In some cases, the accelerator 1008 can be packaged in the same package as other integrated circuits.

In some embodiments, the computing device 1000 can include user equipment. The user equipment can communicate with one or more radio access networks and with wired communication networks. The user equipment can be a cellular phone having telephonic communication capabilities. The user equipment can also be a smart phone providing services such as word processing, web browsing, gaming, e-book capabilities, an operating system, and a full keyboard. The user equipment can also be a tablet computer providing network access and most of the services provided by a smart phone. The user equipment operates using an operating system such as Symbian OS, iPhone OS, RIM's Blackberry, Windows Mobile, Linux, HP WebOS, and Android. The screen might be a touch screen that is used to input data to the mobile device, in which case the screen can be used instead of the full keyboard. The user equipment can also keep global positioning coordinates, profile information, or other location information. The user equipment can also be a wearable electronic device.

The computing device 1000 can also include any platforms capable of computations and communication. Non-limiting examples include televisions (TVs), video projectors, set-top boxes or set-top units, digital video recorders (DVR), computers, netbooks, laptops, and any other audio/visual equipment with computation capabilities. The computing device 1000 can be configured with one or more processors that process instructions and run software that may be stored in memory. The processor also communicates with the memory and interfaces to communicate with other devices. The processor can be any applicable processor such as a system-on-a-chip that combines a CPU, an application processor, and flash memory. The computing device 1000 can also provide a variety of user interfaces such as a keyboard, a touch screen, a trackball, a touch pad, and/or a mouse. The computing device 1000 may also include speakers and a display device in some embodiments. The computing device 1000 can also include a bio-medical electronic device.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, systems, methods and media for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

We claim:

1. A voltage regulator system comprising:
a hybrid regulator configured to convert an input voltage to an output voltage, wherein the hybrid regulator comprises a plurality of voltage regulators including at least a switched-inductor regulator and a switched-capacitor regulator, wherein the switched-inductor regulator is configured to operate in a discontinuous conduction mode to provide a first predetermined amount of charge per switching period, and wherein the switched-capacitor regulator is configured to provide a second predetermined amount of charge per switching period, and wherein the first predetermined amount of charge is identical to the second predetermined amount of charge; and
a first feedback system configured to:
compare the output voltage to a reference voltage to determine a first operating frequency for the switched-inductor regulator and a second operating frequency for the switched-capacitor regulator at which an amount of charge provided by the switched-inductor regulator over a predetermined period of time is balanced with an amount of charge provided by the switched-capacitor regulator over the predetermined period of time, wherein the first feedback system is configured to determine that the first operating frequency is identical to the second operating frequency,
cause the switched-inductor regulator to operate at the first operating frequency, and
cause the switched-capacitor regulator to operate at the second operating frequency, thereby causing the hybrid regulator to provide the output voltage that is within a tolerance range of the reference voltage.

2. The voltage regulator system of claim 1, wherein the first feedback system is configured to cause the switched-inductor regulator to operate at the first operating frequency by providing a first periodic signal having the first operating frequency to the switched-inductor regulator.

3. The voltage regulator system of claim 2, wherein the feedback system comprises a frequency divider that is configured to receive the first periodic signal generated by the feedback control and to generate a second periodic signal having the first operating frequency, and wherein the feedback system is configured to provide the first periodic signal to the switched-capacitor regulator and the second periodic signal to the switched-inductor regulator.

4. The voltage regulator system of claim 1, wherein the switched-inductor regulator comprises a multi-phase switched-inductor regulator having a plurality of regulator cells, and wherein the first feedback system is configured to cause the switched-inductor regulator to operate at the first operating frequency by providing a plurality of periodic signals having the first operating frequency to the switched-inductor regulator, wherein the plurality of periodic signals are out-of-phase from one another.

5. The voltage regulator system of claim 1, wherein the feedback system comprises a feedback control that is configured to generate a first periodic signal, based on the reference voltage and the output voltage, having the second operating frequency.

6. The voltage regulator system of claim 1, further comprising a second feedback system that is configured to determine a difference between a parasitic voltage drop and a target voltage drop of the switched-capacitor regulator and cause the switched-inductor regulator to adjust current provided to the switched-capacitor regulator based on the difference.

7. The voltage regulator system of claim 6, wherein the second feedback system is configured to cause the switched-inductor regulator to adjust the current provided to the switched-capacitor regulator by adjusting one or more of a switching period, an active period, and a duty cycle D of the switched-inductor regulator.

8. The voltage regulator system of claim 1, wherein the first operating frequency is a fraction of the second operating frequency.

9. The voltage regulator system of claim 1, further comprising a plurality of bypass switches, wherein one of the bypass switches is configured to couple an input node of a first voltage regulator and an output node of a second voltage regulator in the hybrid regulator.

10. The voltage regulator system of claim 1, further comprising a control block configured to determine a status of the bypass switches based on one or more of: the input voltage of the hybrid regulator, the output voltage of the hybrid regulator, and a conversion ratio of the switched-capacitor regulator in the hybrid regulator.

11. An electronic system comprising:
a load chip comprising a power domain, wherein the power domain comprises an input voltage terminal and a ground terminal; and
a voltage regulator system of claim 1, wherein the voltage regulator system is configured to provide the output voltage of the hybrid regulator to the input voltage terminal of the load chip.

12. The voltage regulator system of claim 1, wherein a multiplication of the first predetermined amount of charge and the first operating frequency is identical to a multiplication of the second predetermined amount of charge and the second operating frequency.

13. A method of providing an output voltage based on an input voltage, the method comprising:
providing a hybrid regulator configured to convert the input voltage to the output voltage, wherein the hybrid regulator comprises a plurality of voltage regulators including at least a switched-inductor regulator and a switched-capacitor regulator, wherein the switched-inductor regulator is configured to operate in a discontinuous conduction mode to provide a first predetermined amount of charge per switching period, and wherein the switched-capacitor regulator is configured to provide a second predetermined amount of charge per switching period, wherein the first predetermined amount of charge is identical to the second predetermined amount of charge;
comparing, at a first feedback system, the output voltage to a reference voltage to determine a first operating frequency for the switched-inductor regulator and a second operating frequency for the switched-capacitor regulator at which an amount of charge provided by the switched-inductor regulator over a predetermined period of time is balanced with an amount of charge provided by the switched-capacitor regulator over the predetermined period of time, wherein the first operating frequency is identical to the second operating frequency;
causing, by the first feedback system, the switched-inductor regulator to operate at the first operating frequency; and
causing, by the first feedback system, the switched-capacitor regulator to operate at the second operating frequency, thereby causing the hybrid regulator to provide the output voltage that is within a tolerance range of the reference voltage.

14. The method of claim 13, wherein causing the switched-inductor regulator to operate at the first operating frequency comprises providing a first periodic signal having the first operating frequency to the switched-inductor regulator.

15. The method of claim 13, further comprising generating, at a feedback control in the feedback system, a first periodic signal having the second operating frequency based on the reference voltage and the output voltage.

16. The method of claim 13, wherein the switched-inductor regulator comprises a multi-phase switched-inductor regulator having a plurality of regulator cells, and wherein causing the switched-inductor regulator to operate at the first operating frequency comprises providing a plurality of periodic signals having the first operating frequency to the switched-inductor regulator, wherein the plurality of periodic signals are out-of-phase from one another.

17. The method of claim 14, further comprising:
receiving, at a frequency divider in the feedback system, the first periodic signal generated by the feedback control;
generating, by the frequency divider, a second periodic signal having the first operating frequency; and providing the first periodic signal to the switched-capacitor regulator and the second periodic signal to the switched-inductor regulator.

18. The method of claim 13, further comprising:

determining a difference between a parasitic voltage drop and a target voltage drop of the switched-capacitor regulator; and causing the switched-inductor regulator to adjust current provided to the switched-capacitor regulator based on the difference.

19. The method of claim 18, wherein causing the switched-inductor regulator to adjust the current provided to the switched-capacitor regulator by adjusting one or more of: a switching period, an active period, and a duty cycle D of the switched-inductor regulator.

20. The method of claim 13, wherein the hybrid regulator system comprises a plurality of bypass switches, wherein one of the bypass switches is configured to couple an input node and an output node of the one of the voltage regulators in the hybrid regulator.

21. The method of claim 13, further determining a status of the bypass switches based on one or more of: the input voltage of the hybrid regulator, the output voltage of the hybrid regulator, and a conversion ratio of the switched-capacitor regulator in the hybrid regulator.

* * * * *